Inventor
ARTHUR H. BILLOW
By Strauch + Hoffman
Attorney

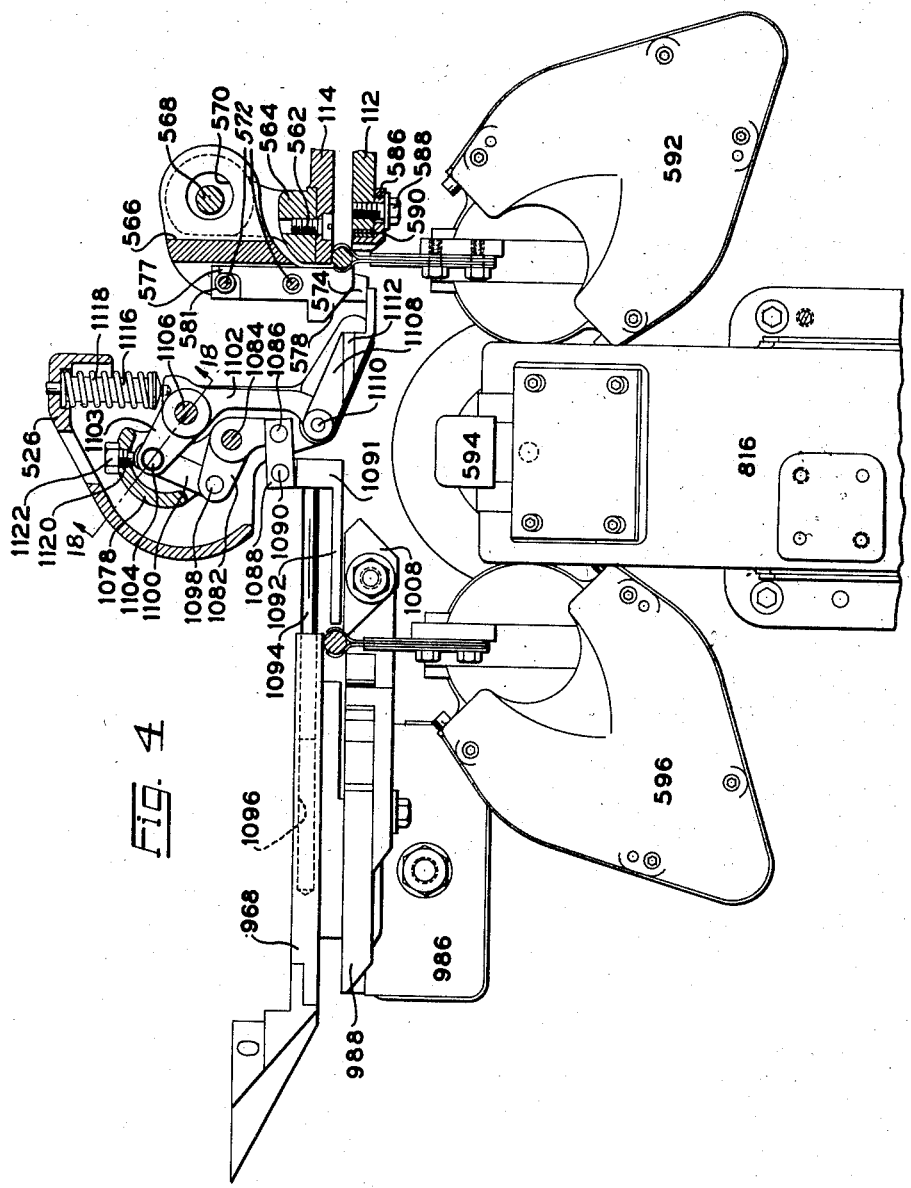

June 30, 1953 A. H. BILLOW 2,643,402
MACHINE FOR FORMING AND THREADING
BOLTS, SCREWS, AND THE LIKE
Filed Jan. 10, 1946 15 Sheets-Sheet 5
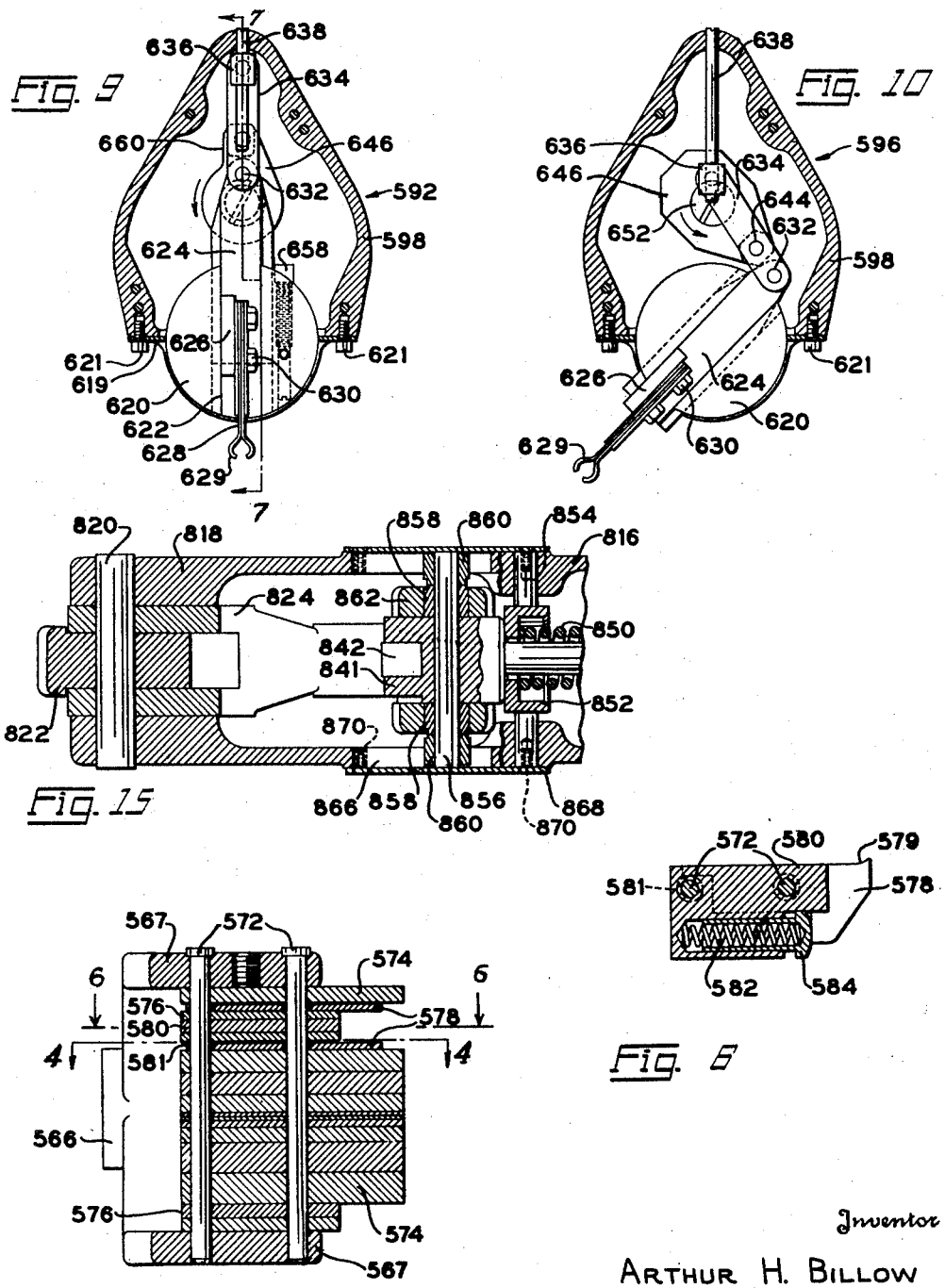
Inventor
ARTHUR H. BILLOW
By Strauch + Hoffman
Attorneys June 30, 1953
A. H. BILLOW
2,643,402
MACHINE FOR FORMING AND THREADING
BOLTS, SCREWS, AND THE LIKE
Filed Jan. 10, 1946
15 Sheets-Sheet 6
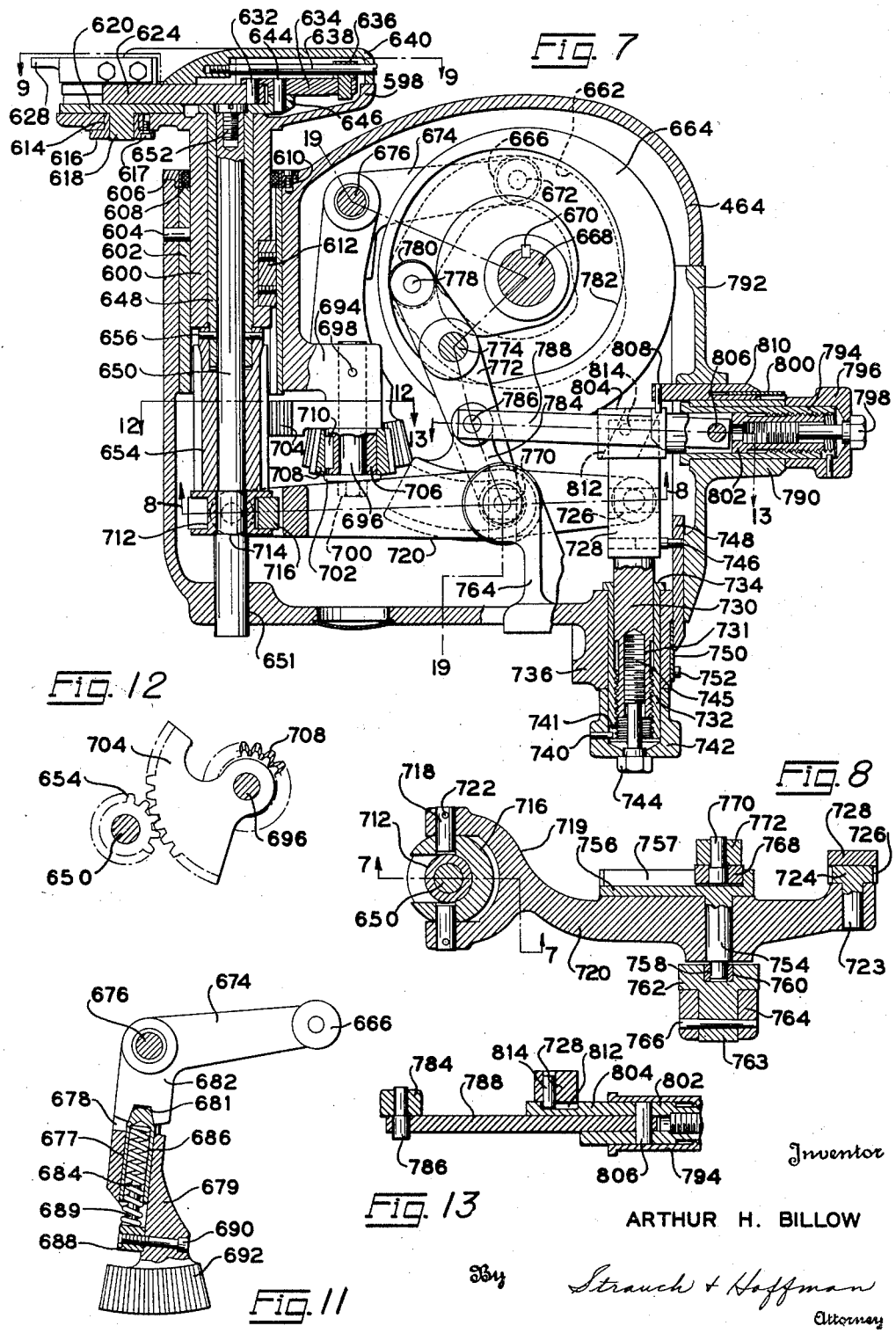
Inventor
ARTHUR H. BILLOW
By Strauch + Hoffman
Attorney

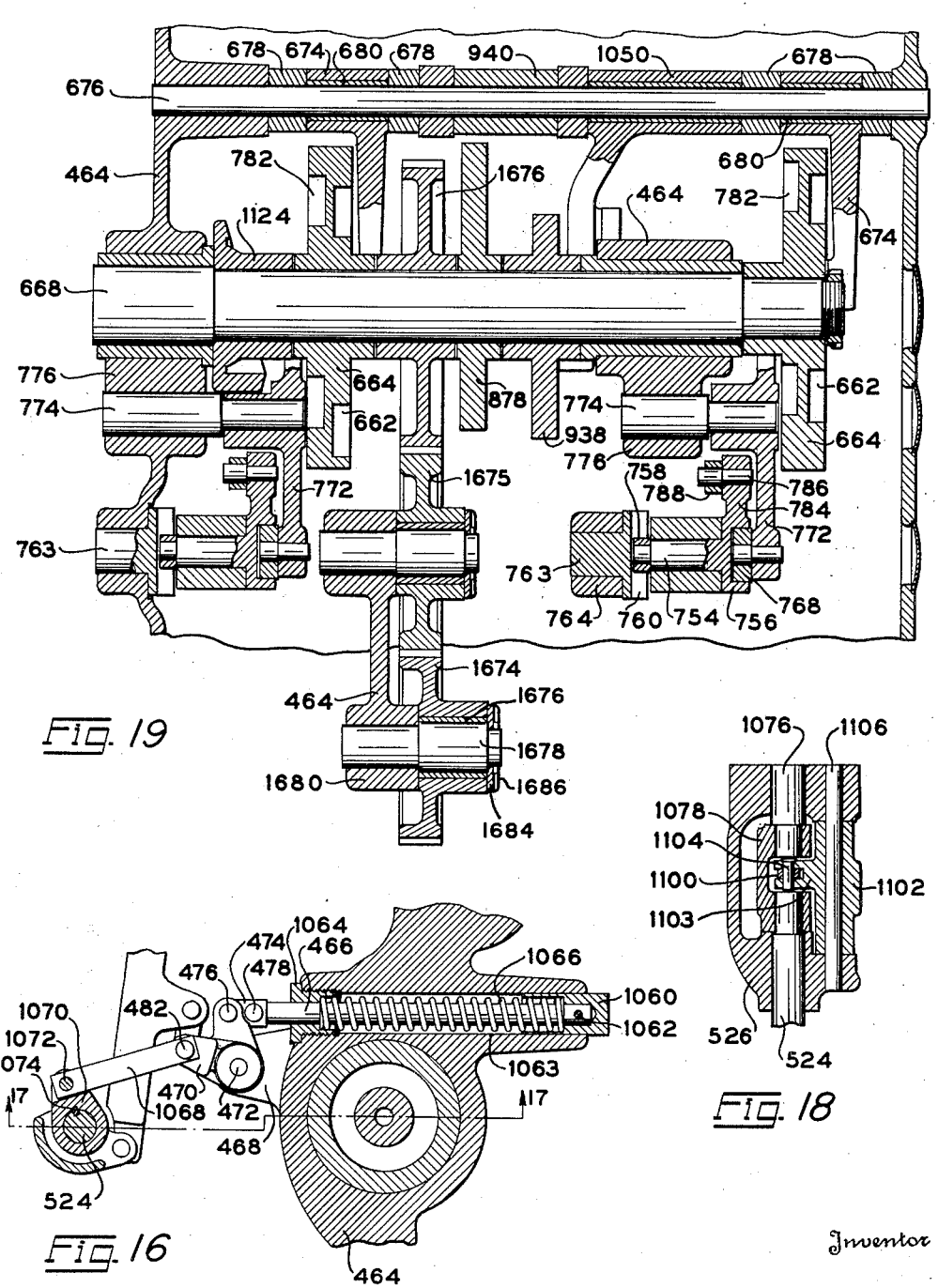

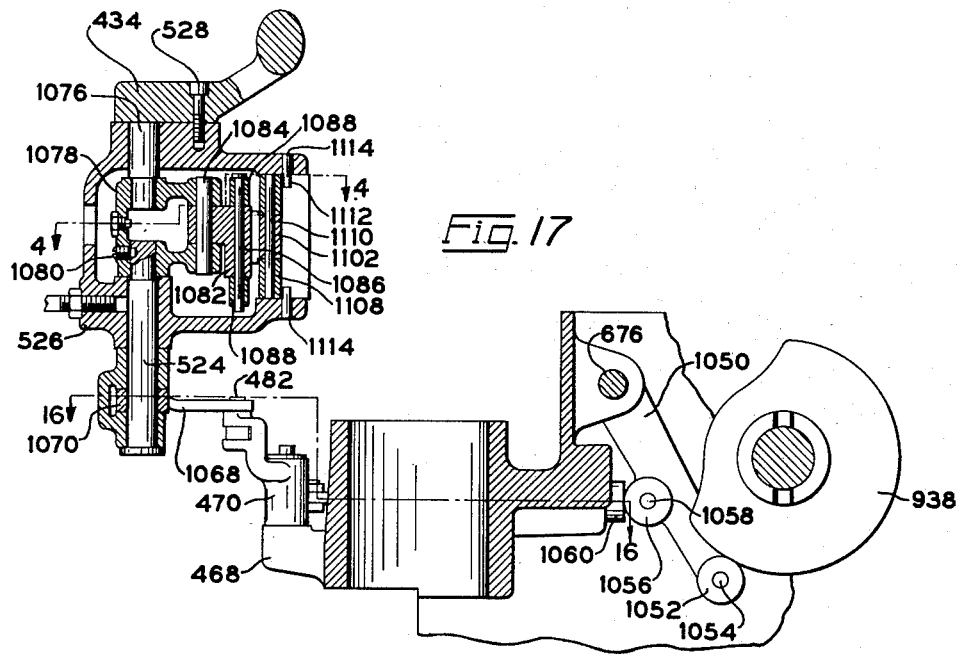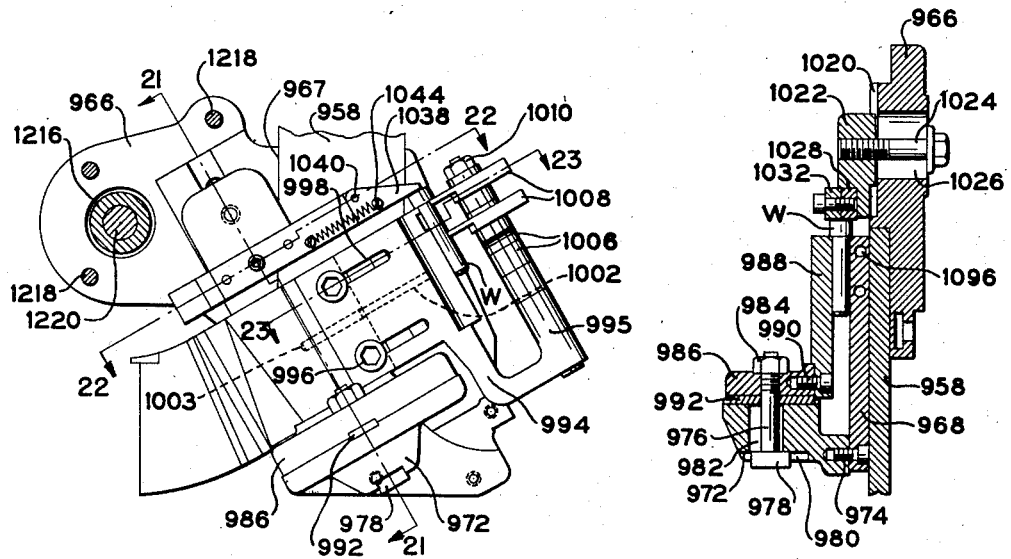

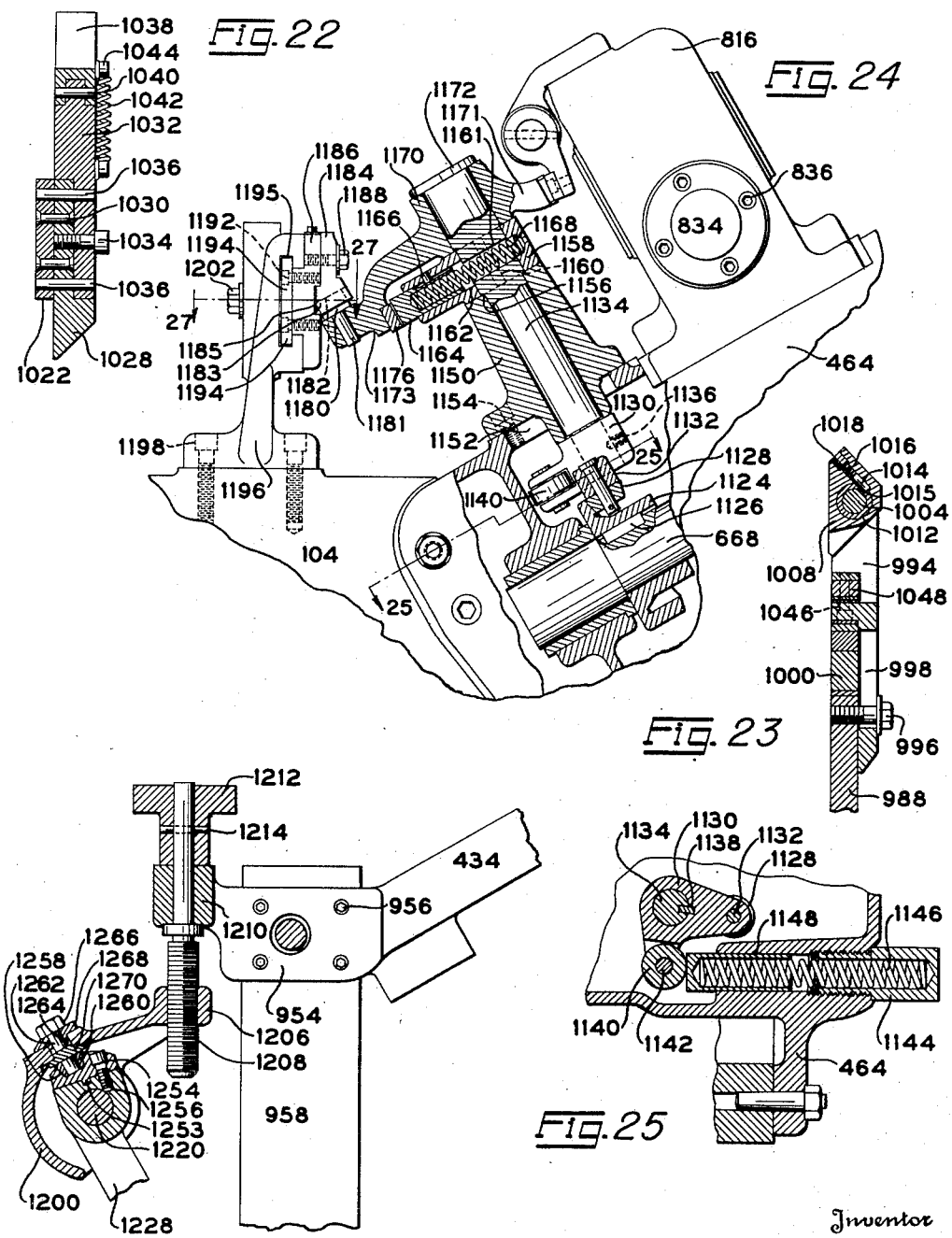

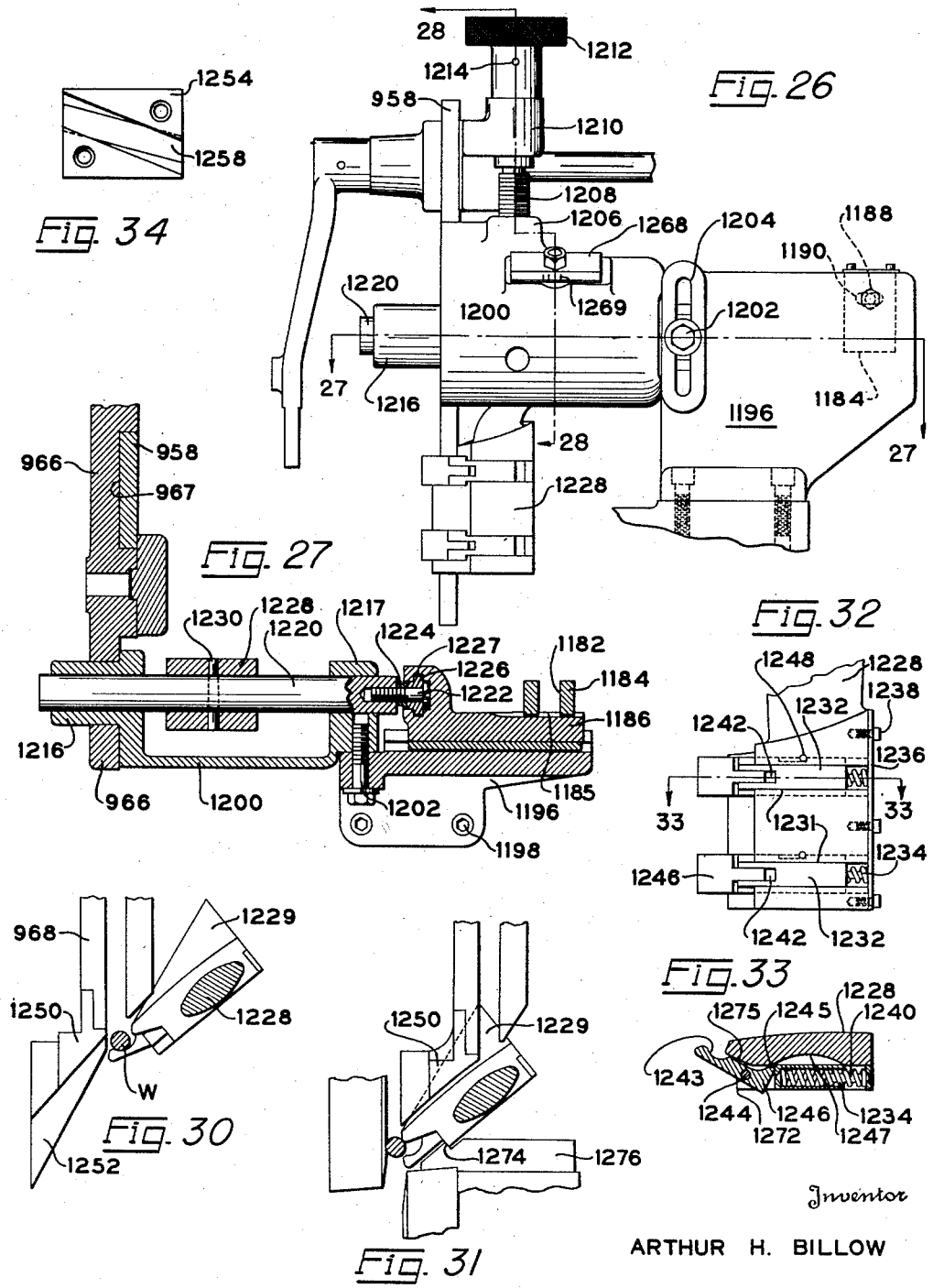

June 30, 1953     A. H. BILLOW     2,643,402
MACHINE FOR FORMING AND THREADING
BOLTS, SCREWS, AND THE LIKE
Filed Jan. 10, 1946     15 Sheets-Sheet 12
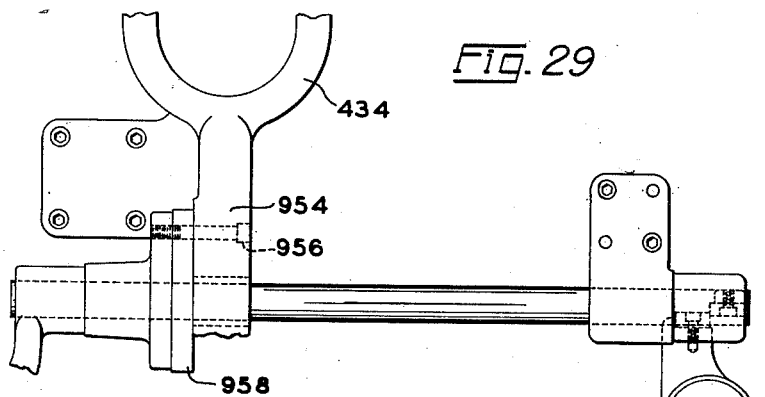
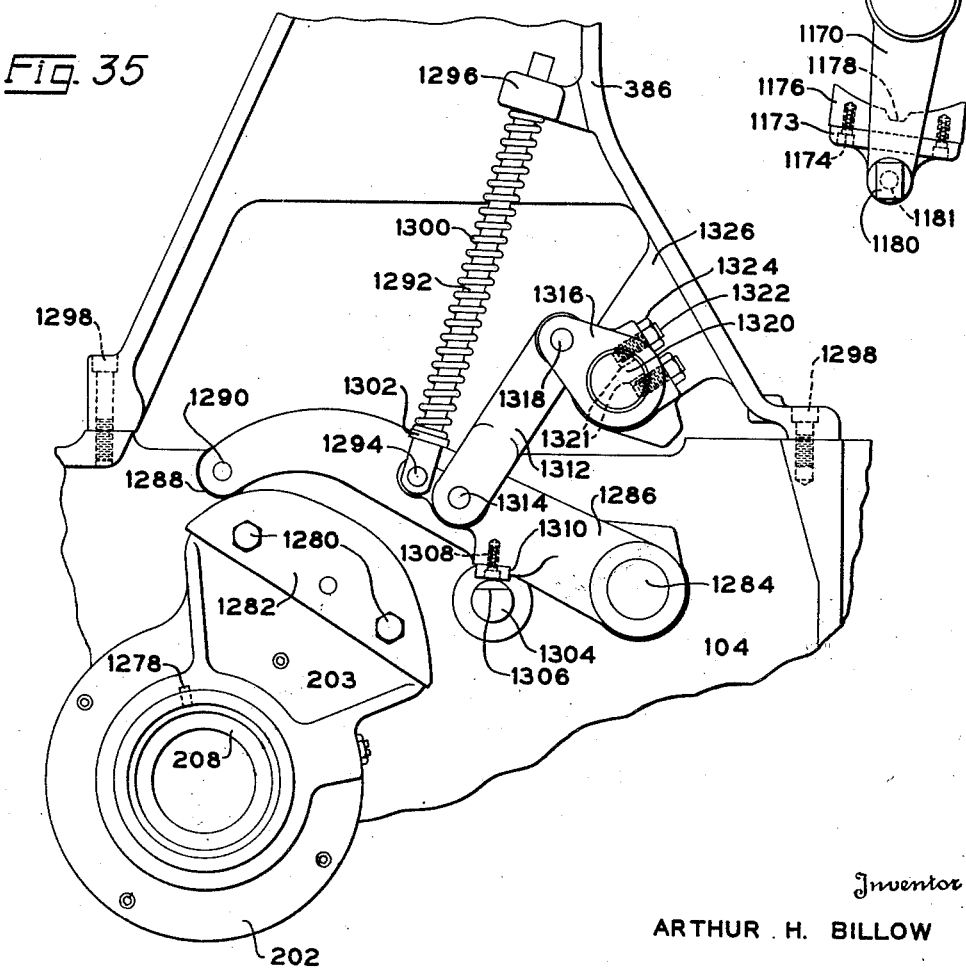
Inventor
ARTHUR H. BILLOW
By Strauch & Hoffman
Attorney

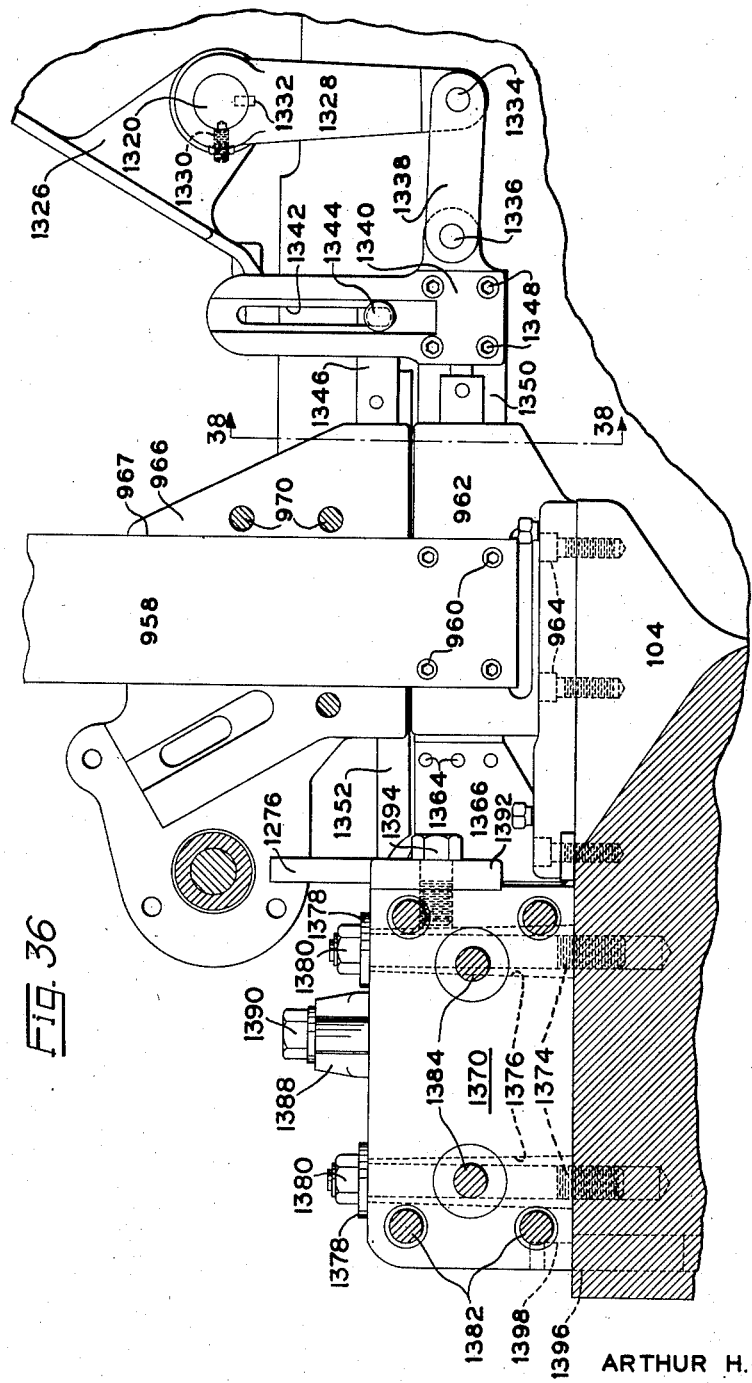

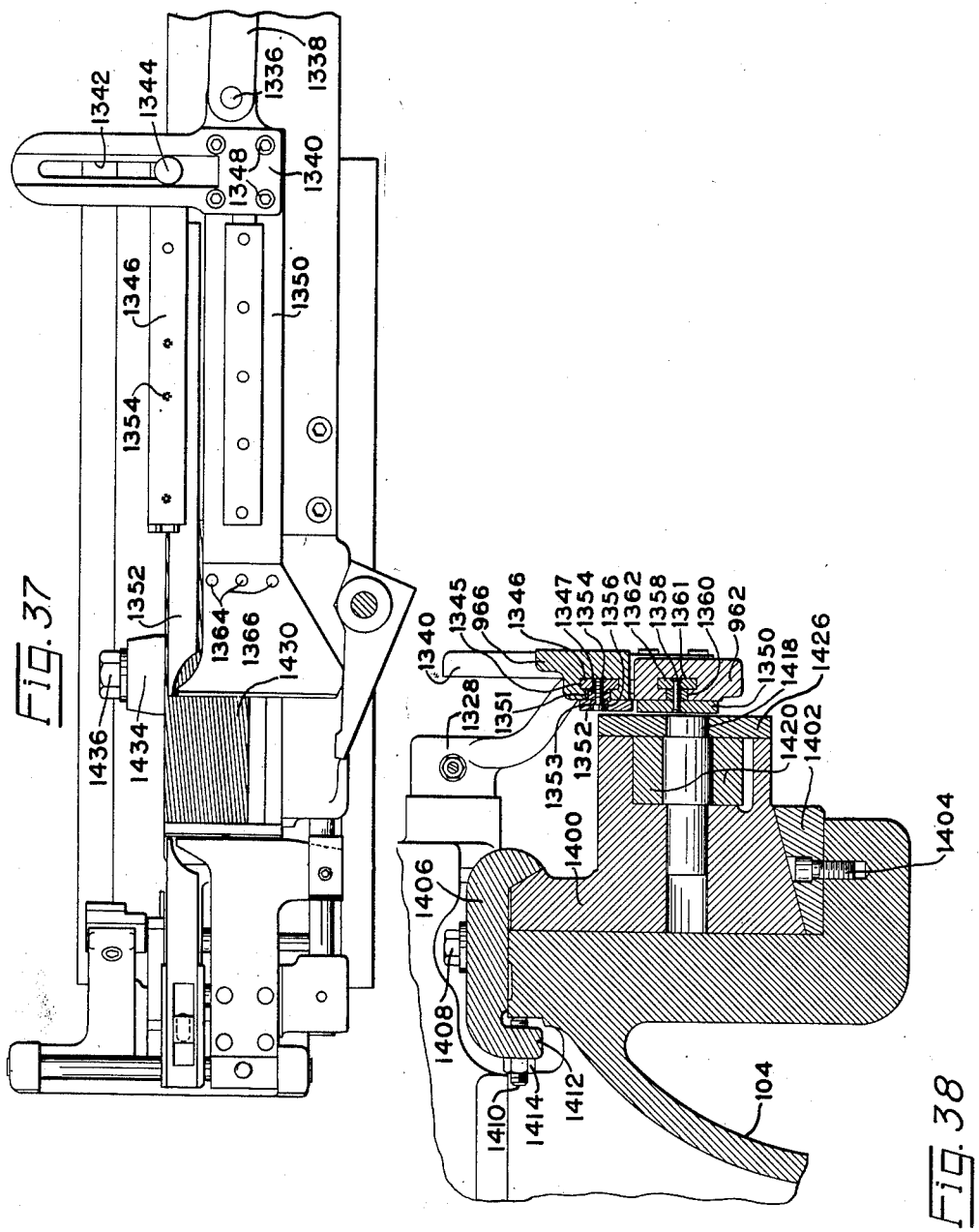

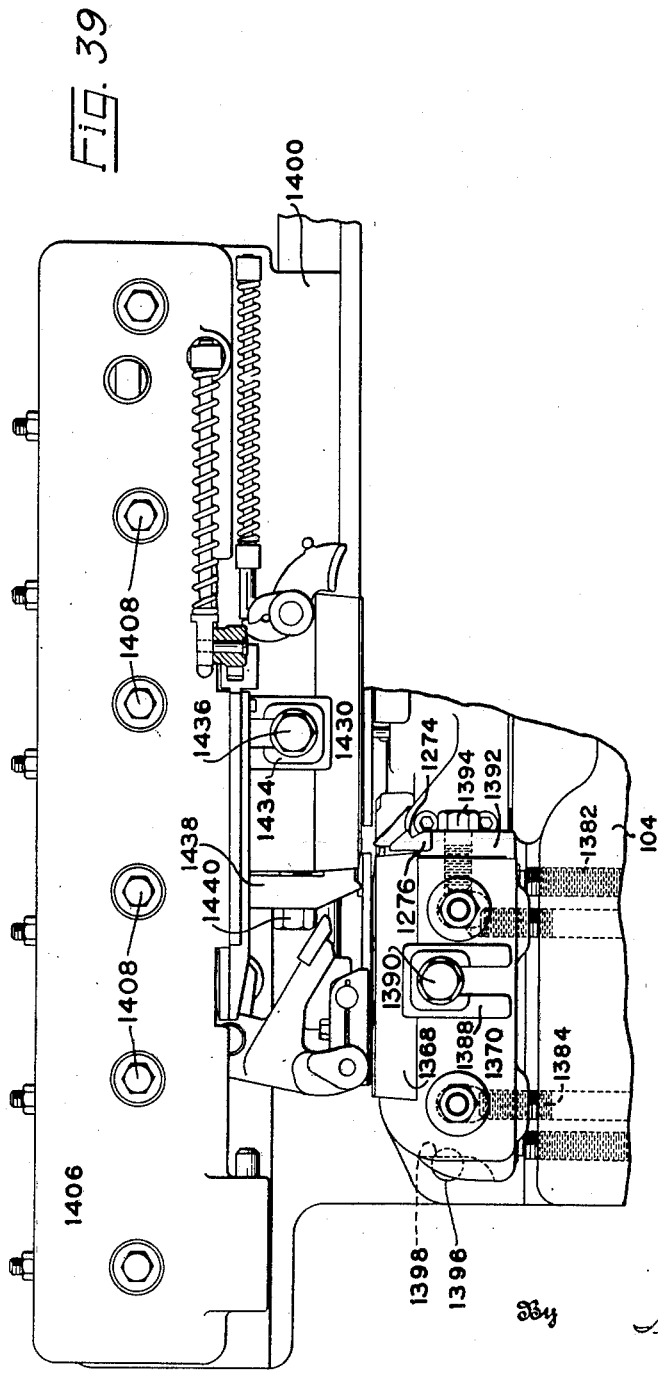

Patented June 30, 1953

2,643,402

UNITED STATES PATENT OFFICE 2,643,402

MACHINE FOR FORMING AND THREADING BOLTS, SCREWS, AND THE LIKE

Arthur H. Billow, Waynesboro, Pa., assignor to Landis Machine Company, Waynesboro, Pa., a corporation of Pennsylvania Application January 10, 1946, Serial No. 640,344

9 Claims. (Cl. 10—4)

This invention relates to a forming and thread rolling machine for bolts, screws and analogous articles, in which in a continuous operating cycle the work-piece is formed with a pointed or chamfered end of desired character, and a thread is accurately rolled upon the periphery thereof.

Heretofore it has been the general practice to roll the thread upon the screw or bolt in one machine, and then transfer the screw or bolt to a second machine for the pointing or chamfering operation. The expense, incident to use of the separate machines, and the duplication of effort and loss of time, makes this method undesirable. Previous attempts have been made to combine these operations in a single machine, generally characterized by the provision of mechanism embodying cutting elements directly associated with the rolling dies for the purpose of pointing or chamfering the work piece simultaneously with the thread forming operation. Such machines have had very limited commercial success. Aside from the unpredictable quality of the point formed on the work piece by this method, difficulties are encountered because of the tendency of the cutting forces to influence the smooth roll of the work between the dies and thereby produce an inaccurate thread. Perhaps the greatest disadvantage of this type of machine is the fact that metal chips are constantly present between the thread rolling dies, resulting in an imperfect thread on the work piece and early destruction of the threading dies.

It is the general object and purpose of the present invention to provide a machine which obviates the above-noted disadvantages and in which the point forming and thread rolling operations are carried out in sequential order at separate stations so that the point or chamfer is formed on the workpiece with the same accuracy as if the work-piece was pointed in a separate machine.

Another object of the invention resides in the provision of improved transfer mechanism for transferring individual work pieces from a hopper chute first to the point forming head, and then to the thread rolling dies.

A further object of the invention is to provide simple and easily operable means for properly adjusting the transfer mechanisms in accordance with varying diameters of the work pieces, the overall length thereof, and the varying length of threads to be rolled thereon.

An additional object of the invention resides in the provision of novel conveyor means for conveying the work piece to the thread forming dies and means which is automatically operable to prevent the actuation of said conveyor means, in the event of failure to clear a previously threaded work piece or other obstruction from between the dies.

It is also one of the objects of the invention to provide simple and efficiently operating safety devices at various points in the machine which will automatically operate to prevent damage to the machine parts in the event of functional failure or other accidents.

The present invention also provides a very simple arrangement of cams and operating gearing therefor whereby the sequential operation of the machine parts in each operating cycle will be properly executed in accurately timed relation to each other.

With the above and other subordinate objects in view, the invention comprises the improved forming and thread rolling machine and the construction and relative arrangement of its several parts as will hereinafter be more fully described, illustrated in the accompanying drawings and subsequently incorporated in the subjoined claims.

In the drawings wherein I have illustrated a preferred practical embodiment of the present invention and in which similar reference characters designate corresponding parts throughout the several views:

Figure 4 is a plan view of the transfer mechanism and adjacent parts, certain of the latter being shown in section as indicated by the lines 4—4 on Figures 5 and 17;

Figure 1:
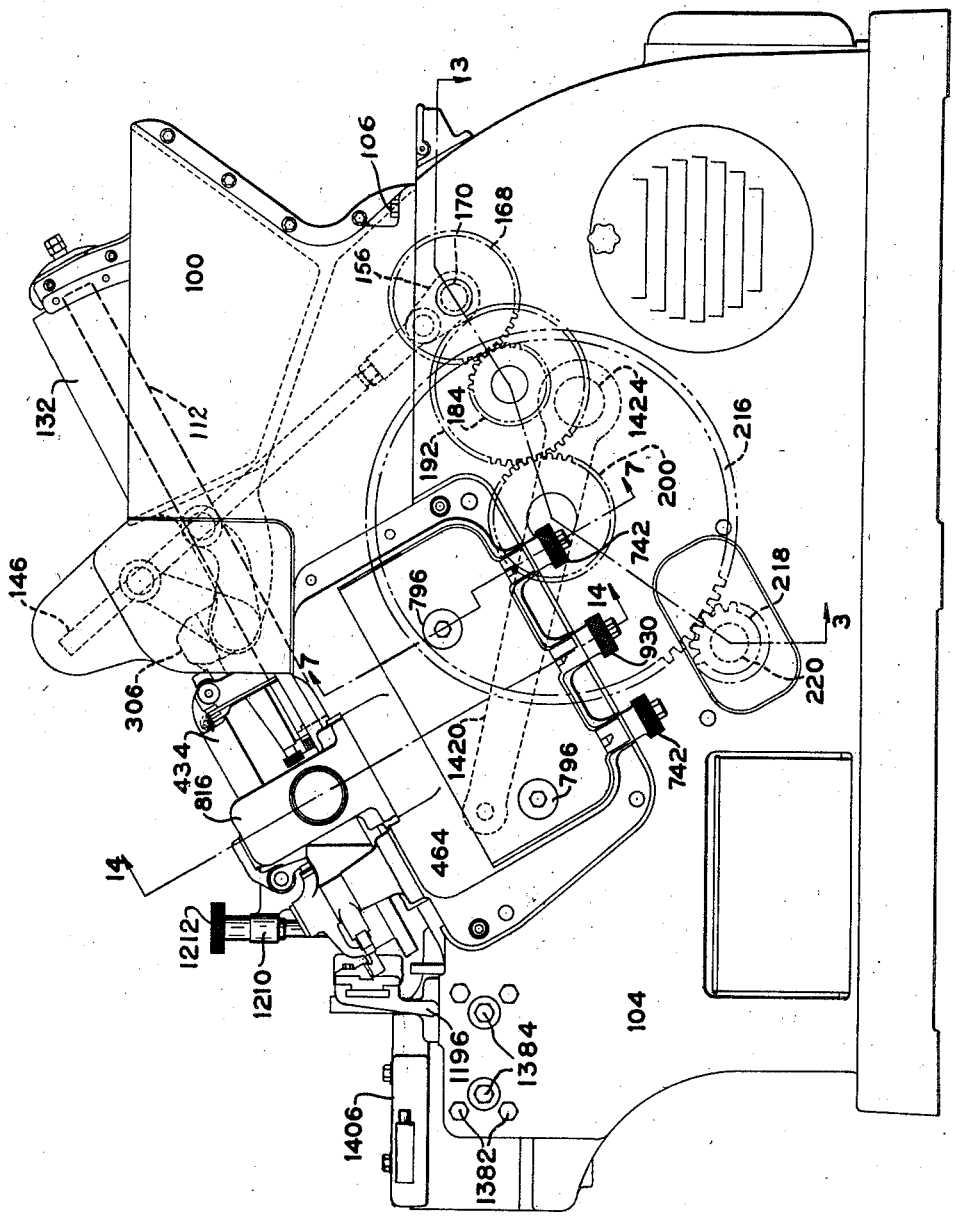
Figure 1 is a side elevation of the machine.
Figure 2:
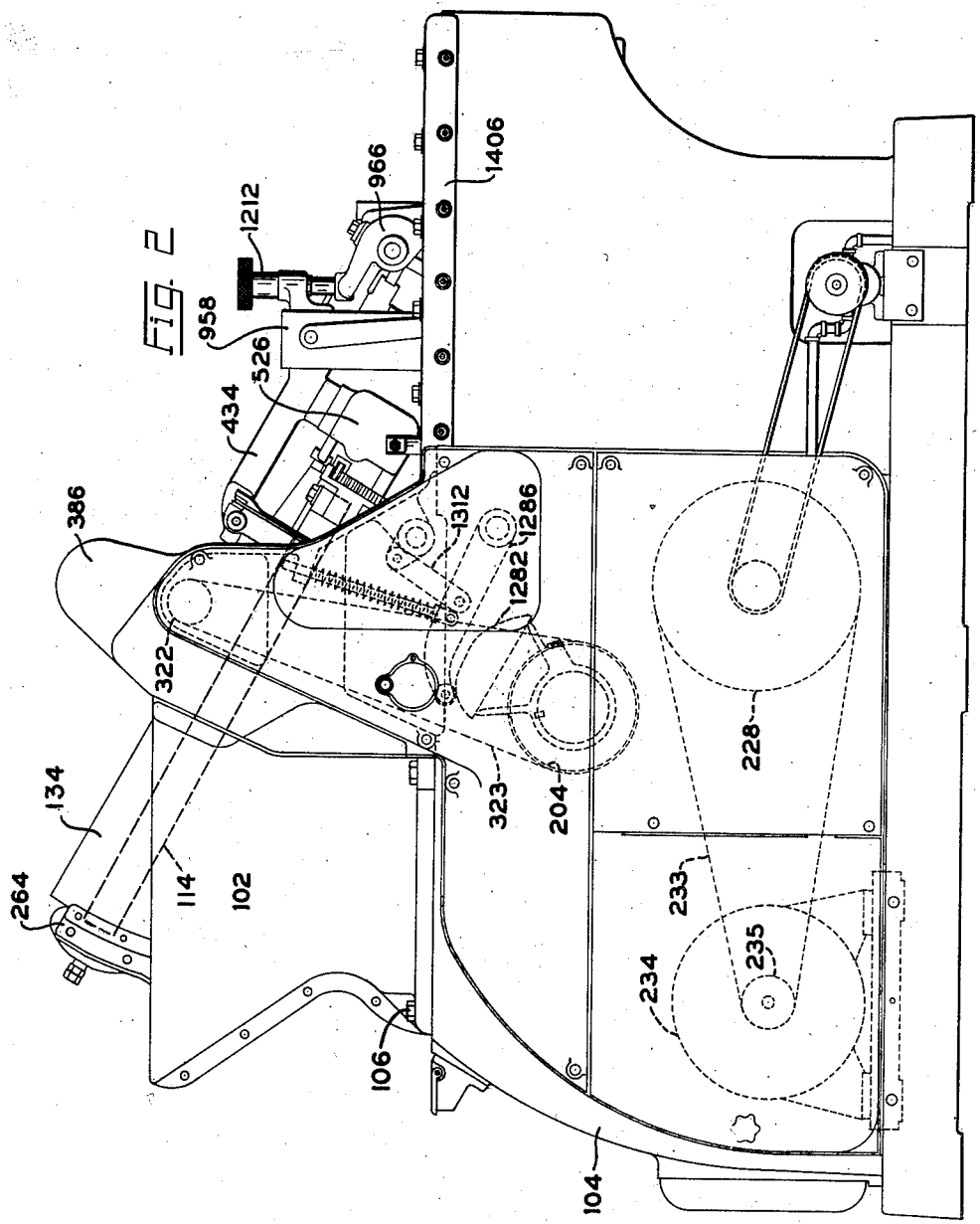
Figure 2 is a similar view showing the opposite side of the machine.
Figure 14:
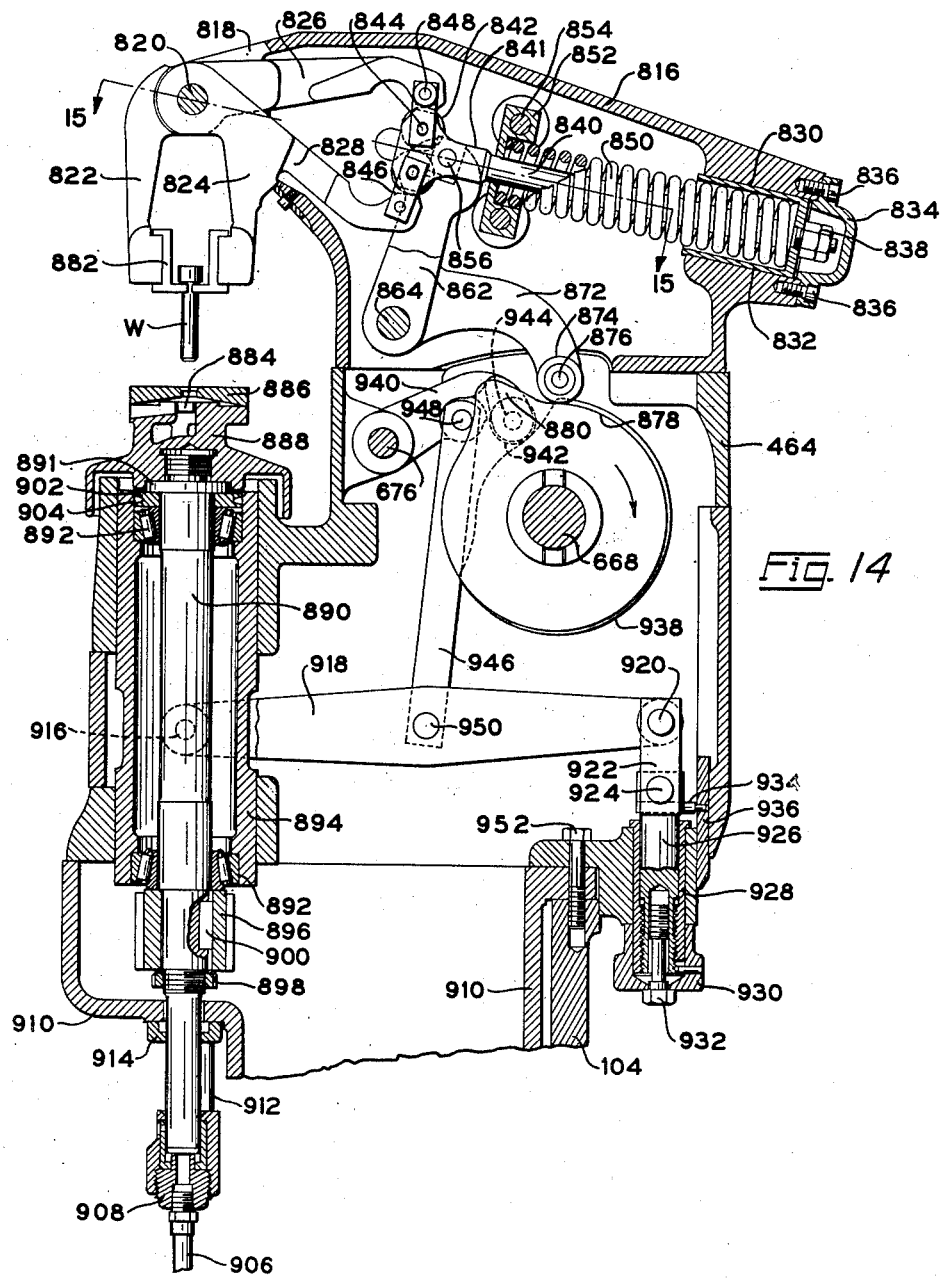

Figure 5, Sheet 5, is a detail vertical section taken substantially on the line 5—5 of Figure 4;

Figure 6, Sheet 5, is a detail horizontal section taken substantially on the line 6—6 of Figure 5;

Figure 7, Sheet 6, is a vertical sectional view taken substantially on the line 7—7 of Figures 1, 8 and 9, showing the actuating means for the transfer mechanisms and the adjusting means therefor;

Figure 8, Sheet 6, is a horizontal sectional view taken substantially on the line 8—8 of Figure 7;

Figure 9, Sheet 5, is a horizontal sectional view of the transfer unit between the hopper chute and forming head, taken substantially on the line 9—9 of Figure 7 and showing the transfer fingers in retracted position;

Figures 10, Sheet 5, is a similar view of the transfer unit between the forming head and the lower chute, showing the transfer fingers in extended position;

Figure 11, Sheet 6, is a detail view of the transfer cam follower lever, certain parts being shown in section;

Figure 12, Sheet 6, is a horizontal section taken substantially on line 12—12 of Figure 7;

Figure 13, Sheet 6, is a horizontal sectional view taken substantially on the line 13—13 of Figure 7;

Figure 14, Sheet 7, is a vertical sectional view taken substantially on the line 14—14 of Figure 1 through the cam housing illustrating the gripping mechanism and the relatively adjustable forming head;

Figure 15, Sheet 5, is a horizontal sectional view taken substantially on the line 15—15 of Figure 14;

Figure 16, Sheet 9, is a fragmentary horizontal section taken substantially on the line 16—16 of Figure 17 and illustrating the feed chute mechanism;

Figure 17, Sheet 8, is a vertical sectional view taken substantially on the line 17—17 of Figure 16;

Figure 18, Sheet 9, is a detail vertical section taken substantially on the line 18—18 of Figure 4;

Figure 19, Sheet 9, is an irregular vertical sectional view through the cam housing taken substantially on the line 19—19 of Figure 7;

Figure 20, Sheet 8, is a detail elevation of the lower chute and associated mechanism;

Figure 21, Sheet 8, is a transverse sectional view taken substantially on the line 21—21 of Figure 20;

Figure 22, Sheet 10, is a horizontal sectional view taken substantially on the line 22—22 of Figure 20;

Figure 23, Sheet 10, is a detail horizontal section taken substantially on the line 23—23 of Figure 20;

Figure 24, Sheet 10, is a detail elevation, partly in section showing the work conveyor operating mechanism and associated parts;

Figure 25, Sheet 10, is a horizontal sectional view taken substantially on the line 25—25 of Figure 24;

Figure 26, Sheet 11, is a detail elevation of the conveyor mechanism;

Figure 27, Sheet 11, is a horizontal sectional view substantially on the line 27—27 of Figures 24 and 26;

Figure 28, Sheet 10, is a vertical sectional view taken substantially on the line 28—28 of Figure 26;

Figure 29, Sheet 12, is a fragmentary plan view of the conveyor mechanism;

Figure 30, Sheet 11, is a fragmentary plan view perpendicular to the lower chute showing the conveyor arm in position to receive a work piece from the chute;

Figure 31, Sheet 11, is a plan view perpendicular to the threading dies showing the conveyor arm in position to place the work piece between the dies;

Figure 32, Sheet 11, is a detail elevation of a part of the conveyor arm;

Figure 33, Sheet 11, is a horizontal sectional view taken substantially on the line 33—33 of Figure 32;

Figure 34, Sheet 11, is a detail plan view of the conveyor control cam;

Figure 35, Sheet 12, is a fragmentary side elevation of the machine with the outer cover plate removed and showing the pusher operating mechanism illustrated in dotted lines in Figure 2;

Figure 36, Sheet 13, is a side elevation of the pusher mechanism and associated parts, certain of which are illustrated in section;

Figure 37, Sheet 14, is a side elevation similar to Figure 36 with certain parts removed to illustrate the safety device associated with the pusher mechanism;

Figure 38, Sheet 14, is a transverse sectional view taken substantially on the line 38—38 of Figure 36;

Figure 39, Sheet 15, is a partial plan view of the machine showing the relative position of the dies at the start of the thread rolling operation;

In the embodiment of the invention shown, work blanks to be operated upon are thrown promiscuously into a hopper located at the top rear end of the machine as shown in Figures 1 and 2. The hopper, together with the usual clearing mechanism may be of conventional design, for example, as shown in Patent 2,090,067.

The hopper herein disclosed comprises two similar sections 100 and 102 disposed in transversely spaced apart relation and rigidly secured to the main frame or bed 104 of the machine by the screws 106. A work guiding chute comprising spaced side plates 112 and 114 (Fig. 4) is adjustably supported between the sections 100 and 102 of the hopper. This chute extends downwardly and forwardly at a substantial inclination, herein illustrated as approximately 30 degrees from the horizontal. Such a chute is adapted to accommodate headed work pieces which are slidably supported in the usual manner upon the upper edges of the chute sides 112 and 114 while the body or shank portion of the work blank depends between said chute sides. These side plates of the chute must therefore be transversely adjustable relative to each other to accommodate work blanks of different diameters. Such adjustment may be accompanied by any of various known means.

The means for supplying the chute with work blanks from the hopper comprises two swinging hopper leaves 132 and 134 (Figs. 1 and 2) mounted for movement in vertical parallel planes at opposite sides of the chute. Work blanks are carried upwardly from the hopper on the upper edges of the leaves 132 and 134 and are deposited upon the top of the chute. Alternate oscillation of leaves 132 and 134 may be provided by connecting them in any suitable manner to rods 146 and 148 respectively (see Fig. 3).

Rod 146 is connected, by means of pin 154 to a crank 156, which is mounted on one end of a shaft 170 for unitary rotation therewith. A spur gear 168 is mounted on the opposite end of shaft 170 which is journalled for rotation in the bearings 172 and 174 integral with the machine base 104. Gear 168 combines the functions of a spur gear and crank for the other rod 148 which is secured thereto by a pin 166, diametrically opposite pin 154.

Figure 3:
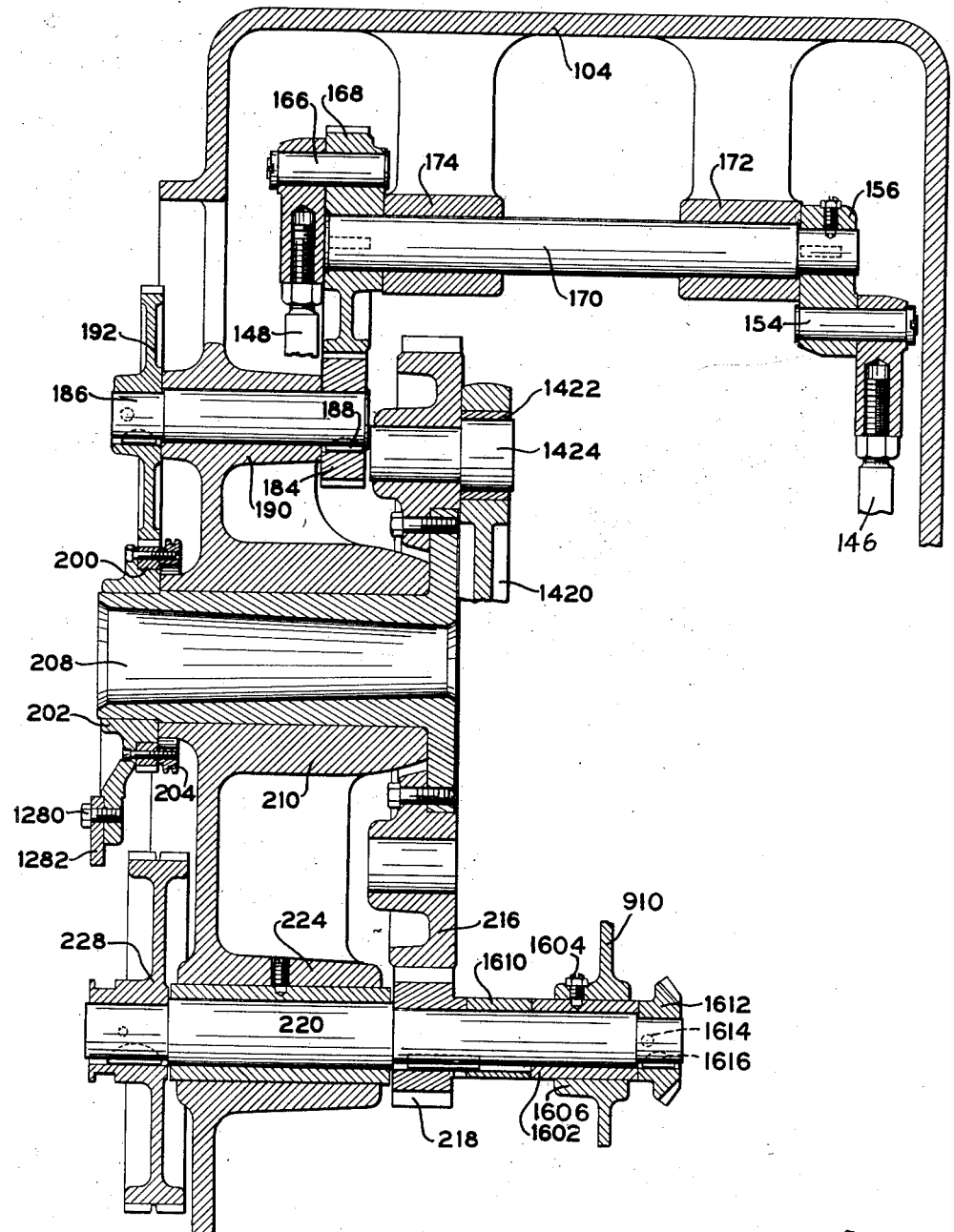
Figure 3 is a horizontal sectional view taken substantially on the line 3—3 of Figure 1 and illustrating parts of the machine driving mechanism.

As shown in Fig. 3, the gear 168 is in constant mesh with a gear 184 keyed to one end of a shaft 186 as shown at 188. This shaft is journalled in bearing 190 integrally formed with the machine bed 104. A gear 192 is secured to the other end of this shaft and is in constant mesh with the ring gear 200 secured in coaxial relation with a cam carrier 202 and a sprocket 204. This assembly is mounted on one end of a hollow shaft 208, journalled in a bearing 210 on the bed 104. Attached to the opposite end of shaft 208 is a large diameter ring gear 216 which is in constant mesh with a pinion 218 on a shaft 220.

Shaft 220, mounted in bearing 224 integrally formed with the bed 104, supports on its outer end a sprocket wheel 228. As seen in Fig. 2 of the drawings, a drive chain 233 connects this sprocket with a driving sprocket 235 on the shaft of motor 234 suitably mounted in the rear end of the machine bed 104.

A bracket 306 (Fig. 1) may be mounted on the bed 104, intermediate the upper and lower ends of the chute side plates 112 and 114, to support a clearing mechanism of suitable construction. The clearing mechanism is for the purpose of preventing travel down the chute of work blanks riding on the heads of those properly aligned in the chute or otherwise improperly arranged in various ways. The mechanism may be driven from sprocket 204 on shaft 208 through a drive chain 323 and sprocket 322 (Fig. 2).

For various reasons which will become apparent from the following description, it is necessary for the efficient operation of the machine that in each operating cycle, only a single work blank shall pass through the lower end of the feed chute. A suitable escapement mechanism which may be of the type shown in Patent 1,912,211 accordingly provided for this purpose is adjacent the chute and below the clearing mechanism. A mechanism for gaging the diameter and length of the work blanks as they pass down the chute may also be used to advantage in cooperation with the lower portion of the chute. The details of such mechanisms, form no part of the present invention and will not be further described.

As shown in Figure 4, Sheet 4, a bracket 564 is securely fixed to the outer side of the chute plate 114 at its forward end by the screw 562. A second bracket 566 is adjustably secured to bracket 564 by a bolt 568, said bracket 566 having a relatively large bolt receiving opening 570 permitting angular adjustment of bracket 566 in any direction relative to the fixed bracket 564 when the bolt 568 is loosened. As seen in Figure 5, the bracket 566 at the front side thereof is provided with upper and lower spaced flanges 567 and between these flanges, a plurality of stop blocks 574 of different thicknesses are retained by the spaced pins 572. In addition to the blocks 574, upper and lower pairs of relatively short blocks 576 are provided with a plunger block 580 between the upper short blocks 576 and the work retainers 578 above and below the latter blocks. The short blocks 576 permit transfer fingers of different widths to grasp the work blanks as will be later described.

As seen in Figures 4 and 6, the work retainers 578 are pivotally mounted on only one rod 572 and at one of their ends are provided with stop lugs 577 to engage spacing collars 581 on the other of said rods and limit pivotal movement of the retainers to normal position. At their other ends the retainers 578 are provided on the edges thereof opposed to the chute with the concave work engaging surfaces 579. The work retainers are urged in a counterclockwise direction by a plunger or detent 584 and spring 582 mounted in the block 580. Thus the work retainers 578 are yieldingly held in proper position to prevent the work blanks from falling through the lower open end of the chute and to releasably retain the same in proper position for removal by the transfer fingers, as clearly shown in Figure 4.

The space between the side plate 112 of the chute and the stop blocks 574 is adjustable by means of a slotted angle plate 586 adjustably secured to the chute plate 112 by screw 588. Between the end flange of this plate and the lower end of chute plate 112, one or more shims indicated at 590 are interposed to position said flange relative to stop blocks 574 in accordance with various work blank diameters.

*Transfer mechanism*

As shown in Figure 4 the work blank is removed from the lower end of the hopper chute by a transfer mechanism, indicated generally at 592 and transported therefrom to a gripping mechanism 594, where it is seized by a pair of gripping members and held while a forming operation of predetermined character is performed upon the end of the work blank. The blank is then removed from the gripping mechanism by a second transfer mechanism 596 and transferred to a lower chute. These transfer mechanisms are similar in construction and operation and will now be particularly described with reference to Figures 4 and 7 to 13 inclusive of the drawings.

As seen in Figures 9 and 10, each unit includes a transfer housing 598 which contains the major part of the mechanism and is integrally formed with the upper end of a tubular shaft 600 (Figure 7, Sheet 6). This shaft is journalled in a bushing 602 for axial movement relative thereto, said bushing being fixed in a vertical bore in the wall of housing 464 by the pin 604. A cover member 606 carrying a suitable sealing device 608 to exclude foreign matter from said bore is secured to the wall of the cam housing 464 by screws 610. A suitable key 612 prevents rotative movement of shaft 600 relative to the bushing 602.

In laterally spaced relation from the shaft 600, the bottom wall of housing 598 is provided with a cylindrical opening 614. A flanged bushing 616 is mounted in this opening and secured to the housing wall by screws indicated at 617. This bushing rotatively receives a stud 618 formed on a circular slide base 620. As seen in Figures 4 and 9, this slide base 620 extends through an open end of housing 598 which is otherwise closed by the plate 619 secured to the end of the housing by screws 621. The top surface of the base 620 is provided with a T-slot 622 which is occupied by a slide 624 of similar cross-sectional form. This slide is provided with an upwardly extending lug 626 to one side of which the resiliently yieldable transfer fingers 628 are secured by means of screws 630. These transfer fingers are disposed in a vertical plane diametrically bisecting the base 620 and have outer oppositely bowed spaced apart free ends 629 to embrace the shank of a work blank. These fingers are sufficiently rigid in a vertical plane to properly support the work blank while being elastically yieldable relative to each other in a lateral direction to release the work blank under pressure by some external force.

The end of slide 624 opposite to that from which the fingers 628 extend is pivotally connected by pin 632 to one end of a link 634. The opposite end of this link has a slide member 636 pivoted thereto, said member being slidingly engaged upon a rod 638 mounted at its opposite ends in a housing cover member 640 and having threaded engagement therewith at one of its ends, as will be seen in Figure 7.

The link 634 is pivotally connected intermediate of its ends by pin 644 to a crank arm 646 formed upon the upper end of a hollow shaft 648 rotatably journalled within the shaft 600. A solid shaft 650 extends through the shaft 648 and at its upper end is connected by screw 652 with the shafts 600 and 648 for unitary axial movement, it being noted that the crank arm 646 has bearing contact with the upper end of shaft 600. The lower end of shaft 650 is vertically movable through an opening 651 in the bottom wall of cam housing 464. Below the shaft 600 an elongated pinion 654 is rotatively mounted on the shaft 650 and at its upper end is connected by pins 656 to the lower end of shaft 648, the upper end of said pinion contacting the lower end of the shaft 600. Thus the shafts 600, 648 and 650 together with pinion 654 have unitary axial movement while the pinion and shaft 648 are also rotatable as a unit relative to shaft 600.

In Figure 9 the transfer mechanism of unit 592 is shown at a point midway of its movement between its work receiving and discharging positions and the slide 624 and link 634 are disposed in alignment with the fixed rod 638. Upon reference to Figure 4 it will be noted that when the transfer fingers are in receiving or discharging position, the parts of the mechanism are disposed in the relative position as seen in Figure 10. It will therefore be apparent that in each transfer operation, the fingers 628 start from the position shown in Figure 10, pass through the position shown in Figure 9 and finally occupy a position with respect to base 620 similar to that shown in Figure 10, but at the opposite side of a median vertical plane longitudinally bisecting the housing 598.

Since there will be a certain amount of backlash in the operating gears, the stopping point of the transfer fingers would be slightly uncertain and in order to insure that in the movement of these fingers to the gripping mechanism, the work blanks will be accurately and correctly positioned for seizure by the gripping members, I have provided an adjustable stop means in the form of screw 658 threaded in the slide base 620 of unit 592 parallel to the slide 624 as shown in Figure 9. When the transfer fingers have been moved to a position opposite that shown in Figure 10 with the work piece accurately centered between the gripping members, the head of the stop screw 658 which has been properly adjusted, strikes an edge face 660 formed on the crank 646, thus precluding movement of the transfer fingers and work pieces beyond the proper predetermined position relative to the gripping mechanism. For this reason a structural form of crank 646 of transfer unit 592 is slightly different from the crank of unit 596.

It is evident from the above that the movement of the transfer fingers in an arcuate path is produced by a rocking motion of the shaft 648. As seen in Figure 7, this rocking motion of the shafts 648 of the two transfer mechanisms in properly timed relation to each other is produced by means of cams 664 one of which is keyed to the cam shaft 668 journalled within housing 464 by means of a suitable key 670. Each cam 664 has a cam track 662 in one side thereof receiving a roller 666 mounted on pin 672 fixed in one end of an arm 674 pivotally mounted at its other end upon the shaft 676 fixedly supported at its opposite ends in walls of the housing 464 (Figure 19, Sheet 9). A second downwardly extending arm 678 is also pivoted on said shaft, arm 674 being preferably mounted between the spaced parts of the bifurcated upper end of arm 678 between which the spacing bushing 680 is interposed.

Preferably a releasable overload connection is provided between the arms 674 and 678 as shown in Figure 11. At its pivoted end arm 674 is formed with a downwardly extending part 682 parallel with the arm 678 and provided in the end thereof with a latch seat 681 having oppositely inclined side walls. Arm 678 is provided with a longitudinal bore 677 opening upon the lower end face thereof in which the latch detent 686 and spring 684 are contained, the upper end of said detent being normally engaged with the latch seat 681 and connecting arms 674 and 678 for unitary pivotal movement. The lever arm 678 is formed with a depending laterally offset part 679 to one side of which block 688 is secured by the screw 690, said block having a guide pin 689 for the spring 684. Thus the spring is held under compression between block 688 and the base of the bore in the latch detent 686.

The lower extremity of the part 679 on lever arm 678 is formed with an arcuate rack section 692. In a lug or extension 694 on the wall of the cam housing 464, the upper end of a stud shaft 696 is fixed by the pin 698. A gear segment 704 is provided with a hollow hub or sleeve 706 upon which the beveled gear or pinion 708 is secured against relative axial or rotative movement by key 710. This segmental gear and pinion assembly is rotatably supported on the stud shaft 696 by means of washer plate 702 and nut 700 threaded upon the lower extremity of said shaft. Rack 692 is in constant mesh with the pinion 708 and the segmental gear 704 is in constant mesh with the elongated pinion 654 on shaft 650. It will thus be understood that the cam track 662 is of such form that in the rotation of the cam lever arms 674 and 678 will be rocked and motion transmitted through rack 692, bevel pinion 708, segmental gear 704 and pinion 654 to the shaft 648 and crank 646 whereby the transfer fingers will be actuated in the required manner.

A peripherally grooved collar 712 is loosely mounted upon the shaft 650 between an annular shoulder 714 thereon and the lower end of pinion 654. In the groove of this collar, a U-shaped member 716 is seated. In each arm of a yoke 719 formed on one end of a lever 720 one end of the pin 718 is secured by a transverse pin 722, the other ends of said pins 718 being pivotally engaged in openings in the opposite sides of the member 716. In an opening in the other end of lever 720, the pin or stud 726 of a slide block 724 is pivotally engaged, said block being slidably movable in slot 726 of a vertically disposed bar 728. This bar is provided with a lower cylindrical portion 730 having a reduced externally threaded stem 731 engaged with the internal thread on the lower end of a bushing 732 mounted in a bearing portion 736 formed on the wall of housing 464. At its upper end bushing 732 has a flange 734 in contact with inner end of bearing 736. A hand knob 742 carries a radially disposed pin 740 engaged at its inner end in a slot 741 in the lower end of bushing 732. Thus the knob 742 and bushing 732 are connected for unitary rotation to cause axial movement of the bar 730. The bar is locked in axial adjusted position by means of a screw 744 extending through the knob 742 and having threaded engagement in the threaded bore 745 of the stem 731.

Bar 728 is connected with a pointer 748 mounted in a guide way in the inner face of cover 792 for housing 464 by means of the pin 746. A plate 750 is secured to bearing 736 by screw 752 and is suitably engraved to measure the movement of the pointer 748.

Referring to Figure 8, the lever 720 is provided with a cylindrical opening intermediate of its ends in which pivot stud 754 integrally formed with the cam member 756 is journalled. This cam member is located on one side of the lever 720 and at the opposite side thereof a sliding block 758 is pivotally mounted on the reduced terminal of the stem 754. This block is slidable in a slot 760 in one side face of member 762, a stud 763 projecting from the opposite side face thereof extending through an opening in the internally projecting bracket arm 764 on the wall of housing 464 and being securely fixed therein by the pin 766.

Member 756 has an arcuate cam track 757 which cooperates with roller 768 on the lower end of a cam follower lever 772 pivotally supported intermediate of its ends upon the stud shaft 774. This shaft is suitably fixed in the bearing portion 776 integral with the wall of housing 464. Upon pin 778 in the upper end of this lever, roller 780 is mounted to cooperate with cam track 782 in the opposite side face of disc 664 with respect to cam track 662.

Cam member 756 is formed with an upwardly extending arm 784 pivotally connected by pin 786 with the inner end of a bar 788. The housing cover 792 is formed with a bearing portion 790 in which bushing 794 is mounted. A cylindrical member 802 has a threaded connection with the bushing 794, and the knob 796 and locking screw 798 and scale 800 on bearing 790 are similar to the corresponding parts above described for the adjustment of the bar 728. In this case however, the member 802 is formed on its inner end with a rectangular head 804, said member 802 being bifurcated as clearly shown in Figure 13, Sheet 6, to receive the outer end portion of bar 788 connected at its extremity to member 802 by the pivot pin 806. The head 804 is connected by means of pin 808 with a pointer 810 slidably mounted in cover member 792 in cooperative relation with the relatively stationary scale 800. One side face of the head 804 is provided with a vertically oblique slot or recess 812 with which a pin 814 fixed in the adjacent side face of bar 728 is adapted to coact as will be presently explained.

The initial vertical position of the transfer mechanism is ajusted in the following manner: After the screw 744 is loosened, the knob 742 and bushing 734 are rotated to move the bar 728 axially. Since lever 720 has a pivotal mounting on shaft 754 at a fixed radius from the stationary pivot shaft 774, lever 720 will be rocked about the shaft 754 to move collar 712 in the opposite direction with respect to bar 728, and thus cause a vertical or axial movement of shaft 650 and the associated mechanism.

The amount of vertical movement automatically transmitted to the transfer mechanism between stations may now be set. This is done by first loosening the screw 798. Knob 796 and bushing 794 are then rotated to axially move member 802. This results in a rocking movement of cam member 756 about the axis of shaft 754 to dispose the cam track in said member at a different vertical inclination with respect to the normal circular path of movement of roller 768 at a fixed radius from shaft 774. This adjustment determines the amount of axial movement of the transfer mechanism in its movement between stations. As the cam track 782 rotates relative to roller 780, arm 772 is rocked about shaft 774 and roller 768 is moved along the cam track 757 of member 756 forcing said member upward or downward as necessary in conformity with the fixed radius of arm 772. Thus shaft 754 is moved vertically relative to bracket 764 and lever 720 is rocked relative to sliding block 724 to produce a proportionately greater vertical displacement of shaft 650 and the transfer mechanism. It is understood that the cam tracks 662 and 782 are properly formed so as to accurately control this vertical movement of the transfer mechanism with respect to the horizontal movement of the transfer fingers.

It will be noted that the two edges of the inclined slot 812 are so located that pin 814 in bar 728 will engage therewith and make it impossible to set the pointer 810 for a greater range of vertical movement of the transfer mechanism than is possible by the initial setting in the operation of bar 728. In other words, if the pointer 748 is set to indicate that the mechanism is near the top of its range of travel, the setting of the pointer 810 must be from the zero point downward. On the other hand if the initial setting is near the center of the range of travel, the pointer 810 may be set so that the mechanism will move through one half of the travel range in either direction. Thus the pin 814 and the slot 812 provide an interlocking connection between the two adjusting devices which precludes vertical movement of the transfer mechanism beyond the predetermined range of travel.

Gripping mechanism

The gripping mechanism which receives the work blank from the transfer mechanism 592 and rigidly holds the same in position while it is operated upon by the forming head is mounted in housing 816. As will be seen from reference to Figures 1 and 24 of the drawings this housing is mounted in a transverse channel of the cam housing 464 and extends over a top opening in the latter housing. The details of the gripping mechanism are best shown in Figures 14 and 15 of the drawings from reference to which it will be seen that housing 816 has an inner open end and projecting portions 818 at opposite sides thereof which are connected by the rod or shaft 820. On this shaft the complementary gripper levers 822 and 824 respectively are pivotally mounted. Preferably, gripper lever 824 has a bifurcated portion between which the lever 822 is pivoted on shaft 820. Each of the levers has a long arm 826 and 828 respectively extending into the housing 816 through the open end thereof, and a relatively short downwardly extending arm upon which gripper elements 882 of conventional form are carried.

The outer end of housing 816 is provided with a cylindrical opening 830 in which a tubular spring retaining member 832 is frictionally fitted and held against axial outward movement through said opening by the cap 834 secured to the housing 816 by screws 836. This cap member 834 encloses lock nuts 838 threaded on the outer end of rod 840 which extends through a central opening in the outer closed end of the member 832. The inner end of rod 840 is provided with a head 841 in which two rollers 842 are mounted upon vertically spaced pins 844. Links 846 have elongated openings in one of their ends receiving the ends of pins 844 and are pivotally connected at their other ends by pins 848 to the ends of lever arms 826 and 828 respectively. Each of these arms is provided with an inclined surface coacting with the periphery of one of the rollers 842.

A powerful coil spring 850 surrounds rod 840 and is held in compression between the retainer member 832 and the spring seat member 852 which is supported by the spaced rods 854 suitably fixed to opposite side walls of the housing 816.

From reference to Figure 14, Sheet 7, it will be evident that the spring 850 yieldingly urges the rod 840 and rollers 842 to the right so that the ends of the lever arms 826 and 828 are positioned at definite distances apart by the coacting rollers 842 to maintain the gripping elements 882 in closed position.

In the head 841 a transverse rod 856 is suitably fixed (Figure 15, Sheet 5). A pair of sliding blocks 858 and 860 respectively are rotatably mounted on each end of this rod at opposite sides of the head 841. An operating lever 862 is pivotally mounted at its lower end upon a shaft 864 suitably fixed at its opposite ends to the walls of housing 816. The upper end of this lever is bifurcated to straddle the head 841 and each arm thereof is provided with a slot which slidably receives one of the inner blocks 858. The outer pair of sliding blocks 860 are slidably mounted in slots 866 in the opposite side walls of the housing 816, which are parallel to the roller carrying shaft 840. These slots are preferably covered by the plates 868 secured to the outer sides of the housing walls by suitable screws 870. The lever 862 is provided at its lower end with a laterally and downwardly curved arm 872 extending within the open top of cam housing 464 and having a pin 876 at its lower end upon which the roller 874 is mounted. This roller is positioned for contact by the cam 878 on the cam shaft 668, said cam being formed with a single peripheral projection 880. Normally the roller 874 is supported by lever 862 in clearance relation to the circular portion of cam 878, said roller being contacted only by the cam projection 880. When such engagement occurs, as shown in Figure 14, lever 862 is rocked in a counterclockwise direction and in turn an axial movement is imparted to rod 840 against the resistance of the spring 850. The rollers 842 are thus removed from contact with the inclined surfaces of the arms 826 and 828 and the links 846 pull said lever arms towards each other, thus moving the gripper elements 882 apart and releasing the work blank.

Forming head

The forming head is of conventional design having a plurality of cutting tools 884 retained in operative position in the head body 888 by the cap member 886. The body 888 has threaded engagement upon the upper end of the vertical spindle 890 which is journalled by bearings 892 in the opposite ends of a sleeve 894. Adjacent to the lower bearing 892 a pinion 896 is secured upon the spindle by nut 898 and key 900. Within the upper end of sleeve 894 above the bearing 892 and between said bearing and the flange 891 on spindle 890, a sealing ring 902 is interposed, said ring having a peripheral groove 904 containing a suitable sealing material which effectively prevents the entrance of chips or other foreign matter into the bearing 892. Spindle 890 has an axial duct or passage (not shown) through which coolant is conducted to the interior of the forming head 888 and distributed adjacent to the cutting tools 884. The coolant is introduced into the lower end of the spindle bore by means of the flexible tube 906 from a supply source and is connected with the lower end of the spindle by means of a fluid tight coupling 908 supported from the wall of gear box 910 by the rod 912. A suitable seal 914 prevents the escape of lubricant from gear box 910 around the spindle 890.

To diametrically opposite sides of the sleeve 894 pins 916 are fixed to which the respective arms of the bifurcated end of the lever 918 are pivotally connected. The opposite end of this lever is pivoted as at 920 to a link 922. The lower end of this link is connected by pivot pin 924 to the upper end of the vertically movable member 926 of an adjusting device, similar to those previously described and including the internally threaded bushing 928, knob 930, screw 932, pin 934 and pointer 936. This pointer coacts with a scale on the outer surface of the bearing for bushing 928, or on a separate engraved plate attached thereto.

At one side of the cam 878, a cam 938 is mounted on the shaft 668. The cam follower lever 940 is mounted at one of its ends on the pivot shaft 676 and carries at its other end the roller 942 mounted on pin 944. A link 946 is connected with levers 940 and 918 intermediate of their ends by pivot pins 948 and 950 respectively. Thus, upon actuation of lever 940 by the cam 938 sleeve 894 and spindle 890 together with the forming head are raised or lowered in the vertical movement of lever 918 on pivot 920. Cam 938 is so constructed as to provide for the rapid upward movement of the forming head to cutting position and a further relatively slow upward movement progressively with the cutting operation. Upon completion of the cutting operation, the forming head is rapidly retracted or lowered to clear the work piece W held between the gripping elements 882 as shown in Figure 14. Thereafter transfer mechanism 596 (Figure 4) is operated to receive the work piece and cam projection 880 actuates lever 862 to release the work piece from the gripping mechanism.

The axial adjustment of member 926 and hence the range of adjustment of spindle 890 is quite limited and is designed to function as a micrometer during the operation of the machine to supplement the vertical adjustment of the transfer mechanism above described.

As seen in Figure 14 one or more screws 952 rigidly connect the cam housing 464 and gear box 910 with the bed 104 of the machine.

Lower chute construction

As shown in Figure 1, a yoke shaped bracket 434 is secured at its upper end to the above-mentioned bracket 306. Bracket 434 extends downwardly and forwardly above a portion of the upper chute and the transfer mechanism. As seen in Figure 28, Sheet 10, and Figure 29, Sheet 12, the bracket 434 is provided near its forward end with a rectangular horizontal extension 954 which is secured to the upper end of the vertical bar 958 by the attaching screws 956. The lower end of this bar is rigidly secured by screws 960 to a bracket 962 which in turn is anchored to the machine bed 104 by the screws 964 (Figure 36). Another bracket 966 has a vertical groove in one side thereof, as indicated at 967, receiving the bar 958 for sliding movement relative thereto, as seen in Figure 20, Sheet 8 and Figure 27, Sheet 11. The bracket 966 is secured to one side member 968 (Figure 21) of the lower chute by the screws or bolts 970 (Figure 36), thus forming a chute mounting assembly which is vertically adjustable upon the bar 958.

The lower chute base 972 (Figure 21, Sheet 8) is secured to the slide member 968 of the chute by screws 974. A bolt 976 having a rectangular head 978 at one end, seated in groove 980 in the bottom surface of chute base 972 extends upwardly through elongated slot 982 in said base, and, with nut 984 threaded upon the upper end thereof adjustably secures a slide 986 upon the base 972. To the slide 986, the other chute side member 988 is secured at its lower edge by means of the screws 990 and is therefore adjustable with the slide towards and away from the opposed side member 968 of the chute to adjust the space between the chute sides for work blanks of different diameters. Pivotal movement of slide 986 relative to base 972 is prevented by means of the key indicated at 992.

With continued reference to Figure 20, Sheet 8 and Figure 23, Sheet 10, a bracket 994 is attached to the side member 988 of the chute by screws 996. These screws pass through the longitudinal slots 998 in the bracket whereby the latter may be longitudinally adjusted relative to the chute side members. A plurality of spacing blocks 1000 are adapted to be interposed between the upper end of the chute side 988 and bracket 994, as seen in Figure 23, Sheet 10. These blocks are supported by one or more pins 1002 (Figure 20) suitably fixed at one of their ends to the bracket 994 and movable in bores indicated at 1003 in the side member 988 of the chute. This adjustment is required because of the fact that the entire lower chute assembly may be raised or lowered on bar 958 as may be required by the different thread lengths to be formed on the work blanks. The transfer mechanism must be adjusted accordingly, for since the latter moves in a path at an angle of 30° from the horizontal while the lower chute is vertically adjustable, spacing members 1000 in the required number and thickness must be employed, so that in all relatively adjusted positions of the transfer mechanism and lower chute assembly, the transfer fingers will accurately position the work blanks relative to the lower chute (Figure 4).

The bracket 994 is provided at one end with a U-shaped arm 995, parallel to the chute sides 968 and 988. A rod 1004 is mounted at its lower end in one leg of this bracket arm and upon the same two stripper fingers 1008 together with a number of cylindrical spacing blocks 1006 are supported and retained thereon in assembled relation by the nut 1010 threaded upon the upper end of said rod. As seen in Figure 23, the stripper fingers project inwardly from the bracket arm beyond the vertical plane of the inner side face of chute member 988, and thus in the normal position of said fingers obstruct the entrance of the work blank into the chute. A bushing 1012 is fixed to the rod 1004, and the stripper fingers 1008 are oscillatable relative thereto.

Each of the fingers carries a pin 1014 slidably mounted in a bore therein and yieldingly urged by spring 1016 into engagement with a stop shoulder 1015 formed on the bushing 1012. The bore in the stripper finger is closed at its outer end by the screw 1018.

As seen in Figures 4 and 23, the stripper fingers 1008 may revolve slightly in the clockwise direction against the resistance of springs 1016. Movement of said fingers in a counterclockwise direction from the position shown is prevented by the binding engagement of pins 1014 with said fingers and the bushing 1012. Therefore when the fingers of transfer mechanism 596 are moved in the clockwise direction from the position shown in Figure 4, the work piece will be stripped from said transfer fingers and assume the position in the chute shown in Figure 21, Sheet 8 of the drawings.

A head bar is necessary to retain the work pieces in the chute. As seen in Figure 21, the bracket 966 is provided with a shallow rectangular groove 1020 which receives a mating tongue on one side of the bracket 1022. Screw 1024 passing through slot 1026 in the bracket 966 retains the bracket 1022 in adjusted position relative to the top of the lower chute. A head bar end section 1028 is secured to the bracket 1022 by rivets 1030 as shown in Figure 22, Sheet 10. The body section 1032 of the head bar is removably attached to end section 1028 and bracket 1022 by the screw 1034 and pins 1036. This body section is made removable so that a short section may be employed when the lower chute is raised on bar 958 and a longer section substituted when the chute is disposed at the lower end of said bar as seen in Figure 36, Sheet 13. A third section 1038 is pivotally connected to section 1032 by the pin 1040. Below said pivot pin, a tension spring 1042 has its opposite ends attached to the head bar sections 1032 and 1038 by suitable screws 1044. This spring retains the section 1038 of the head bar yieldingly in opposed relation to the heads of the work pieces in the chute. Said section 1038 is displaced or manually lifted from this position against the resistance of spring 1042 only when access to the work pieces in the chute may be required.

To the bracket 994 (Figure 23), between the spacing blocks 1000 and stripper fingers 1008, another series of spacer strips 1048 are secured by screws indicated at 1046 for the purpose of adjusting the width of the opening into the chute in accordance with the particular diameter of the work blank.

*Chute safety mechanism*

This mechanism, shown more particularly in Figures 4, 16, 17 and 18 of the drawings is principally contained in the housing 526 which is attached to brackets 434 by screws 528 and is operated, as seen in Figure 17 by the cam 938, which is the same cam used to axially move the forming head. A cam follower lever 1050 is pivoted at one of its ends on shaft 676 and its other end carries pin 1054 on which roller 1052 is mounted. Intermediate of its ends, a second roller 1056 is carried on pin 1058. A bore 1063 is formed in an extension of the housing 464, the outer end of said bore being closed by a bushing 1064 threaded therein. A rod 466 is journalled for axial movement in bushing 1064 and has a cylindrical member 1060 secured to its inner end by a pin 1062. This member 1060 and the bushing 1064 are provided with suitable seats for the opposite ends of the compression spring 1066 which yieldingly urges the head 1060 to constant contact with the periphery of roller 1056. It will therefore be evident that in the operation of cam 938, rocking motion of lever 1050 is transmitted through the roller 1056 in the form of reciprocating motion to the rod 466. The outer end of rod 466 is connected to a link 474 by means of a pin 478. Another pin 476 pivotally connects link 474 to one arm of a bell crank 470. A lug 468 formed on the wall of housing 464 carries a pivot stud 472 upon which crank 470 is mounted.

A link 1068 is connected at one of its ends with the other arm of this crank by pin 482, the other end of said link being connected to a crank arm 1070 by pin 1072. This crank is fixed by the key 1074 to shaft 524 mounted in the lower side of the housing 526 as seen in Figure 17, Sheet 8. Another vertical shaft 1076 is frictionally fixed in the top wall of housing 526 in alignment with the shaft 524. On the opposing ends of these shafts, the spaced parallel arms of a crank 1078 are engaged, one of said arms being fixed to the upper end of shaft 524 by set screw 1080. A bell crank lever 1082 has its central portion disposed between and pivotally connected to the spaced arms of crank 1078 by the pin 1084. One arm of this lever, as seen in Figure 4, is pivotally connected by pin 1086 with one end of the links 1088. The other ends of these links are pivotally connected by pin 1090 to the angularly disposed end 1091 of a plunger bar 1092. Guide rods 1094 parallel with bar 1092 are suitably fixed in the end 1091 thereof.

As clearly seen in Figure 4, the guide rods 1094 are slidably engaged in longitudinal bores 1096 formed in the lower chute side plate 968 so as to accurately guide the plunger 1092 in its reciprocating motion between the side members 968 and 988 of the lower chute.

The other arm of bell crank lever 1082 is pivotally connected by pin 1098 with one end of a link 1100, the other end of which is connected by pin 1104 to an angular arm 1103 on one end of a lever 1102. This lever is pivotally supported intermediate of its ends upon a rod 1106 fixed at its opposite ends to the top and bottom walls of the housing 526. The other end of lever 1102 is connected by pin 1110 with a sliding bracket 1108 having grooves 1112 in its upper and lower faces to receive the ends of pin 1114 fixed in the top and bottom walls of the housing and which insures a straight line movement of the bracket 1108 (Figure 17).

In the operation of the mechanism above described, it will be apparent that the reciprocatory motion of the rod 466 will rock shaft 524 and consequently crank 1078. This motion of the crank is transmitted to lever 1082 and links 1088 to reciprocate the plunger 1092 between the spaced sides 958 and 988 of the lower chute at the rate of one stroke per cycle of operation. In the event that the work blanks are not being removed from the lower end of the chute and the chute becomes filled to capacity, so that the transfer fingers of the transfer unit 596 would have no place to deposit another blank, the reciprocation of plunger 1092 would then become impossible.

In this event, the continued rocking motion of crank 1078 would then be transmitted through lever 1082 and link 1100 to rock lever 1102 in a counter-clockwise direction from the position seen in Figure 4 and move bracket 1108 to the right and position said bracket over the opening at the lower end of the upper chute through which the transfer fingers of the work transfer unit 592 must enter, thereby rendering it impossible for this transfer unit 592 to remove further work blanks from the upper chute.

A detent member 1116 and spring 1118 interposed between a shoulder on lever 1102 and the wall of housing 526 returns the lever 1102 and bracket 1108 to normal position. A set screw 1120 threaded in the crank 1078 and locked in adjusted position by the nut 1122 is engaged by link 1100 to form a stop limiting the extent of travel of bracket 1108 to its normal position.

*Conveyor mechanism*

It will be understood that the side walls of the lower chute are also inclined at an angle of approximately 30 degrees and are in substantial parallelism with walls 112 and 114 of the upper chute within the hopper. The conveyor mechanism now to be described, conveys the work piece from the lower end of the lower chute to a point between the thread rolling dies where it must assume a vertical position.

Referring to Figures 24 and 25, Sheet 10 of the drawings, the conveyor operating cam 1124 is fixed to shaft 668 for unitary rotation therewith by the key 1126. The operating face of the cam is engaged by a roller 1128 mounted upon pin 1132 carried by one arm of a double armed crank 1130. This crank is secured upon the lower end of a shaft 1134 by set screw 1136 and held against rotation relative to said shaft by the key 1138 (Figure 25).

Shaft 1134 is journalled in a bracket 1150 having a base secured over the opening 1152 in the top wall of the cam housing 464 by screws 1154. The other arm of lever 1130 also carries a roller 1140 mounted upon pin 1142. A tubular retainer 1144 for a spring 1146 is threaded in the wall of cam housing 464 and holds said spring in compression against the base wall of the tubular detent 1148 which has bearing contact against roller 1140. Thus roller 1128 is yieldingly urged into contact against the camming surface of cam 1124.

Shaft 1134 has an enlarged upper end portion forming shoulder 1156 which, together with lever 1130 prevents axial movement of the shaft relative to bracket 1150. A latch holding member 1158 is mounted upon this enlarged portion of the shaft and is connected thereto for unitary rotation by the key 1160. Member 1158 has a bore 1162 radially of shaft 1134 which communicates at its inner end with a diametrical opening 1161 through shaft 1134 of relatively smaller diameter. A latch member 1164 is slidably mounted in the bore 1162 and restrained against rotation by the pin 1166. A spring 1168 has one of its ends attached to the member 1158 and extends through the shaft opening 1161 and bears at its other end against the base of a tubular portion of latch member 1164 to yieldingly urge said member outwardly from the member 1158.

Above the member 1158, a bracket 1170 is mounted upon the upper end of shaft 1134 for rocking movement and is held against axial displacement relative to member 1158 by the terminal flange 1172 formed on said shaft. As shown in Figure 29, the bracket 1170 has a forwardly extending arm which is formed adjacent its ends with a flange 1173 to the rear face of which the latch engaging member 1176 is secured by means of the screws 1174 (Figure 29). Member 1176 has a rear arcuately curved face centrally provided with a seat 1178 for the latch member 1164. Thus the rocking motion of shaft 1134, induced by cam 1124, is normally transmitted to bracket 1170, but upon abnormal resistance to such motion of bracket 1170, for reasons to be later described, the latch member 1164 is forced inwardly and disengaged from seat 1178 so that shaft 1134 and member 1158 may rotate independently of the bracket 1170.

The foremost extremity of the bracket arm 1170 is provided with an opening in which the stem 1181 of a sliding block 1180 is journalled. As shown in Figure 24, Sheet 10, this block is of rectangular form and has sliding engagement in a groove or guide-way 1182 formed in the member 1184 secured to a slide 1186 by screw 1188 passing through a slot 1190 in member 1184 (Figure 26) to permit lateral adjustment of said member relative to the slide. Pivotal movement of member 1184 is prevented by the rib 1183 formed thereon engaged in slot 1185 formed in the slide 1186. The slide 1186 has a portion of reduced width to which a flange 1194 is secured by screws 1192, thus providing a T-shaped assembly which is mounted for lateral sliding movement in the T-shaped slide way 1159 of a stationary bracket 1196. Screws 1198 secure the base of this bracket to the top of the machine bed 104.

To the bracket 1196, one end of a conveyor housing 1200 is attached by the bolt or screw 1202 as best shown in Figure 27, Sheet 11. Further support is provided for this housing in the form of the adjusting screw 1208 threaded in a part 1206 formed on the housing wall and rotatably mounted in a forwardly extending part 1210 on the bracket 434, as shown in Figure 28, Sheet 10. A flange or shoulder on the screw and operating knob 1212 secured thereto by pin 1214 holds the screw against axial movement in the boss 1210. As shown in Figure 27, the other end of housing 1200 is formed with a bearing boss 1216 mounted in an opening in bracket 966 which supports the lower chute mechanism as above described. The screw or bolt 1202 passes through a vertical slot 1204 formed in the bracket 1196. It is therefore evident that by loosening the screw 1202 and operating the adjusting screw 1208, bracket 966 and housing 1200 are vertically adjustable as a unit. Housing 1200 is further rigidly secured to bracket 966 by means of the screws 1218 shown in Figure 20, Sheet 8 of the drawings.

A shaft 1220 (Figure 27) is journaled at one end in the boss 1216 and at its opposite end in the bearing lug 1217 on the housing 1200. The latter end of the shaft has a tapped bore into which screw 1222 is threaded. This screw supports a spacer 1224 and a T-shaped slide member 1226. This member is movable in a vertically disposed T-slot 1227 in the end of the slide member 1186. Therefore as the bracket 1170 is rocked, the slide 1186 and shaft 1220 are reciprocated as a unit.

Within the housing 1200, a conveyor member 1228 is fixed to the shaft 1220 by means of the pin 1230. This conveyor extends downwardly from the shaft, and as best seen in Figures 26 and 30 to 32, Sheet 11, has a relatively wide lower end portion provided with a surface facing the egress end of the lower chute which is of spiral helical form as indicated at 1229, and the lead angle of which is substantially equal to the inclination of the lower chute above the horizontal. The opposite side face of said lower end of the conveyor member is a plane surface, and as seen in Figure 32 is provided with spaced parallel T-slots 1231 in which the slide members 1232 are mounted. Springs 1234 yieldingly urge these slide members in one direction and are held in compression between said members and an end plate 1236 which is secured to the conveyor member by means of screws 1238. To the plate 1236 guide pins 1240 are riveted to retain the springs 1234 in alignment with bores in the slide member 1232.

The outer ends of the slides 1232 are provided with slots 1242 in which conveyor fingers 1246 are pivotally mounted upon the pins 1244. These fingers at their outer ends are provided in one side thereof with the concave work receiving recesses 1243 and at their inner ends are formed with the transverse extensions 1245 which are adapted to coact with the opposed concave surfaces 1247 on conveyor member 1228 and prevent pivotal movement of said fingers in one direction beyond a position in axial alignment with the slide members 1232, as will be clearly understood from reference to Figures 31 and 33 of the drawings. Movement of the slide members and fingers to projected position under the action of spring 1234 is limited by pins 1248 fixed in member 1228 extending through longitudinal recesses formed in one side of the respective slide members as clearly seen in Figure 32.

Referring now to Figures 30 and 31, to the lower end of the chute side member 968 an extension 1250 is securely riveted, said extension having a forward surface 1252 which is also formed as a helical spiral having a lead angle equal to the inclination of the lower chute above the horizontal, and with which the corresponding surface 1229 of the conveyor member 1228 is adapted to cooperate in the movement of the work blank from the lower chute to the thread forming dies.

As shown in Figure 28, Sheet 10, the upper end of the conveyor member fixed to shaft 1220 has a flat top surface provided with a groove to receive a rectangular tongue or rib 1253 formed on the bottom surface of a camming member 1254 which is secured to conveyor member 1228 by the screws 1256. As shown in Figure 34, Sheet 11, this camming member has a helical groove 1258 formed in the top surface thereof which is provided with oppositely inclined side walls. This groove receives a roller 1260 journalled upon the inner end of a stud 1262 laterally adjustable in a slot 1264 in the wall of housing 1200. A clamping plate 1268 at the outer side of the housing wall is engaged by nut 1266 threaded upon the outer end of stud 1262 and together with the flange 1270 on stud 1262 which engages the inner side of the housing wall, securely retains the roller 1260 in its adjusted position. As seen in Figure 26, Sheet 11, clamping plate 1268 has a beveled longitudinal edge provided with scale graduation 1269 to cooperate with an index mark on the external surface of the housing 1200.

In Figure 30, the conveyor 1228 is shown at the starting position of its operative movement relative to the lower end of the lower chute. As the shaft 1220 is axially moved towards the left in Figure 27, as above described, the conveyor 1228 is carried with said shaft across the egress end of the chute to the position seen in Figure 31. The coaction of the stationary roller cam 1260 with the laterally moving cam groove 1258 causes the conveyor member to advance in a helical path. The lowermost work blank in the chute has been received in the concave seats of the conveyor fingers 1246 and as the work blank is conveyed laterally in rolling contact with the spiral surface 1252 of member 1250, it is moved from the inclined position of Figure 30 to the position of Figure 31 with its axis vertically disposed instead of at the 30 degree angle at which it was supported in the chute. Of course it will be understood that in this helical movement of the conveyor, shaft 1220 and screw 1222 rotate as a unit relative to the slide block 1226.

As the conveyor 1228 arrives at the position of Figure 31, the protruding corners 1272 of the slide members 1232 strike a shoulder 1274 formed in a clamping member 1276 for the stationary threading die to be later described. Members 1232 are thus moved inwardly against the resistance of the springs 1234, and in this movement, the fingers 1246 coacting with bevelled cam surfaces 1275 on conveyor member 1278 are moved to the straight line position as seen in Figure 31 in alignment with members 1232 as the inner ends 1245 of said fingers ride upon the concave surfaces 1247. Thus the work blank is released by the conveyor fingers in a vertical position for movement between the threading dies.

*Pusher mechanism*

The purpose of this mechanism is to positively introduce the work blank between the thread rolling dies and deposit it at a point from which its continued travel will be effected by the movable die member. Referring to Figures 35, Sheet 12, the operating cam 1282 for this mechanism is secured to a radially projecting arm 203 of the cam carrier 202 by means of the screws 1280. As seen in Figure 3 of the drawings the carrier 202 is preferably additionally secured to the end of shaft 208 by means of key 1278 for unitary rotation therewith.

A stud shaft 1284 suitably fixed in a bearing on the wall of machine bed 104 provides a pivot for one end of a cam follower lever 1286. A roller 1288 mounted upon pin 1290 in the other end of this lever contacts the periphery of the cam 1280. A rod 1292 is pivotally attached by pin 1294 to the lever 1286 intermediate of its ends and its other end is movable through an opening in a guide lug 1296 pivotally formed with the machine cover 386 which is secured to the bed 104 by screws 1298. Spring 1300 surrounding the rod 1292 is held in compression between a flange 1302 formed on said rod and lug 1296 and yieldingly holds the rollers 1288 in contact with cam 1282. A stud 1304 fixed to the wall of machine bed 104 is provided with a flat surface 1306 for engagement by a block 1310 attached to the lower edge of lever 1286 by screw 1308. Since the cam 1282 is in contact with the roller 1288 for only a portion of each revolution of shaft 208, this stop means is provided to support the lever 1286 during the remainder of the revolution of shaft 208, and thus retain the roller 1288 in proper position for engagement by cam 1282.

A link 1312 connected at one end with lever 1286 by pin 1314 is also pivotally connected at its other end by pin 1318 to a crank arm 1316. This crank arm is mounted upon one end of a shaft 1320 for angular adjustment relative to said shaft, said arm carrying spaced adjusting screws 1322 each having a locking nut 1324 threaded on its outer end and bearing at their inner ends against the base walls of notches or recesses 1321 in the shaft 1320. Thus by adjusting the screws 1322, the crank arm 1316 may be secured in desired angular position relative to the shaft 1320 to rotate as a unit therewith. Shaft 1320 is journalled at its opposite ends in spaced bearing lugs 1326 on the wall of cover 386 and it is evident that by the coaction of cam 1282 and roller 1288, a rocking motion is transmitted through the link 1310 and crank arm 1316 to the shaft 1320.

As seen in Figures 36 and 38, Sheets 13 and 14, a crank arm 1328 is attached by means of set screw 1330 and key 1332 to the other end of the shaft 1320. This crank is pivotally connected at its lower end by means of link 1338 and pins 1334 and 1336 to a bracket 1340 having an upwardly extending portion provided with a vertical slot 1342. A bolt 1344 movably attached to the extension 1346 of an upper pusher plate 1352 (Figure 38). The bracket 1340 is directly attached by means of screws 1343 to the extension 1350 of a lower pusher plate 1366, the forward end of the extension 1350 being riveted to the pusher plate as indicated at 1364.

As shown in Figure 38, the bracket 966 is provided with a T-shaped slide way 1345, in the wider portion of which the upper pusher plate extension 1346 is engaged. Extension 1346 is provided upon one side with a rib 1347 seating in a groove provided in the opposed face of a rib 1351 on the pusher plate 1352. This rib has a longitudinal slot communicating with a groove 1353 in the plate 1352 which receives a slide block 1356 on the headed end of a screw 1354 threaded in the pusher plate extension 1346. It will thus be apparent that by loosening screw 1354 relative longitudinal adjustment of the plate 1352 and extension 1346 may be obtained, while when the screw is tightened, the assembly has unitary sliding movement relative to bracket 966. This enables the upper pusher plate to be adjusted for work blanks having heads of different diameters. It will also be noted that the upper pusher plate is vertically adjustable relative to the lower plate 1366 as a unit with bracket 966, the conveyor and the lower chute so that the upper plate 1352 will engage the work blank near its head regardless of variations in length of the blanks.

As also shown in Figure 38, to one side of the lower pusher plate extension 1350 bars 1360 and 1362 of relatively different widths are secured by rivets 1358 to form an assembly slidably mounted in a T-slot 1361 formed in the bracket 962.

*Thread rolling die mechanism*

Referring now to Figures 36 to 39 of the drawings, it will be seen that the stationary die 1368 is mounted in a suitably recessed portion of the die block 1370. In the use of dies which are of less width than the full depth of the die seat, shims may be employed in well-known manner so that the top surface of the die will be flush with the top surface of the die block 1370. The die block is adjustably secured to the bed 104 by stud bolts 1374 threaded in said bed and passing upwardly through openings 1376 in the die block. Washers 1378 and nuts 1380 threaded upon the upper ends of the bolts firmly clamp the die block in position. Adjustment of the die block 1370 and stationary die 1368 is obtained by means of two sets of screws 1382 and 1384 respectively (Figure 36, Sheet 18), which are horizontally mounted in the bed 104. Screws 1382 are threaded in the bed 104 and at their inner ends bear against the one side face of the block 1370. Therefore by rotating the screws 1382, the die block and die 1368 may be transversely adjusted on the machine bed 104 in one direction. The screws 1384 have threaded engagement at their inner ends in the die block 1370 and upon operation thereof move the die block and die 1368 in the opposite direction on bed 104.

Die 1368 is securely retained in a fixed position upon the block 1370 by two clamps, one of which, indicated at 1388 is secured to the die block by screw 1390. The other clamp 1392 secured to the block at its rear end by screw 1394 is provided with the extension 1276 containing the shoulder 1274 for engagement with conveyor slides 1232 as above described. A pin 1396 fixed in the bed 104 has a part extending above the bed provided with a flat side face 1398 to engage a surface at the forward end of the die block 1370 and prevent shifting movement of the block in an endwise direction during the operation of the movable die (Figures 36 and 39).

A ram 1400 is mounted for horizontal sliding movement upon a bearing strip 1402 secured by screws 1404 to the bed 104 (Figure 38). The top of the slide way in which ram 1400 moves is formed by the member 1406, secured to bed 104 by screws 1408 passing through elongated openings in said member and threaded in the bed 104. The member 1406 is transversely adjustable by the screws 1410 which are threaded in a downwardly extending flange 1412 on member 1406 and have bearing contact at one of their ends against the bed 104. Nuts 1414 threaded upon the other end of said screws, lock the same in adjusted position.

As seen in Figure 38 in the ram, near its rear end, a stud shaft 1418 is suitably fixed at one of its ends, and upon a large diameter section of said shaft, the forward end of a connecting rod 1420 is pivotally engaged. As seen in Figure 3 the rear end of this connecting rod contains a bushing 1422 which receives one end of a crank pin 1424 eccentrically fixed in the ring gear 216. As seen in Figure 38, a plate 1426 is secured to the ram 1400 and provides a continuous surface adjacent to and parallel with the pusher plate 1366 throughout the travel of the ram.

The movable die 1430 is mounted in a suitable seat formed in the forward end of the ram 1400. This die is removably secured in position by means of a top clamp 1434 secured to ram 1400 by the screw 1436 and end clamp 1438 secured to ram 1400 by screw 1440 (Figure 39).

*Gear box*

As shown in Figure 3 the shaft 220 is journalled at one of its ends in a bushing 1602 fixed in a boss 1606 on the wall of gear box 910 by the set screw 1604. A spacer 1610 surrounds shaft 220 between the bushing 1602 and the gear 218 and holds the latter against lateral movement in one direction against the shoulder 223 formed on said shaft. Within the gear box 910 a bevel pinion 1612 is secured to the end of shaft 220 by set screw 1614 and key 1616. The bevel pinion 1612 may be connected by any suitable gearing to the pinion 896 (Fig. 14, Sheet 7) for driving the forming head and also to the spur gear 1674 (Figure 19, Sheet 9) for driving the cam shaft. Gear 1674 with bushing 1676 is rotatably mounted on one end of a stud shaft 1678, the other end of which is fixed in an internal boss 1680 of the cam housing 464. A washer plate 1684 and pin 1686 retain the gear 1674 against axial movement on shaft 1678.

As seen in Figure 19, Sheet 12, gear 1674 meshes with a similarly mounted gear 1675, which in turn is in constant mesh with a gear 1676 mounted on the cam shaft 668. Thus power is supplied from gear 1672 through gear 1676, which together with conveyor operating cam 1124, one cam 664 for operating transfer unit 596, gripper operating cam 878 and cam 938 for vertically moving the forming head are connected for unitary rotation with shaft 668 by interlocking keys and keyways on the confronting end faces thereof. Operating cam 664 for transfer unit 592 is fixed to shaft 668 by key 670 as above described.

*Operation*

At the start of each cycle of operation of the machine above described, the work transfer devices are substantially in the position shown in Figure 4 with respect to the upper and lower chute sections respectively and the forming or pointing head. It will of course be understood that the forming head and the transfer fingers of the two units 592 and 596 rotate about axes which are perpendicular to the inclined chute sections. A single work blank has been released from the lower end of the upper chute by the escapement mechanism and is grasped between the fingers of the upper transfer unit 592. The cam member 664 keyed to shaft 668 now actuates the transfer mechanism in the manner above described to transfer the work piece from the upper chute section to the forming head. Simultaneously the work piece held by the fingers of the lower transfer unit 596 is delivered into the lower chute section. This work blank which was pointed or chamfered in the previous cycle of operation is automatically conveyed to a position between the thread forming dies with its axis exactly perpendicular to the path of movement of the movable die in the manner previously explained. The pointing operation has now been completed and the fingers of the transfer unit 592 have returned to the position shown in Figure 4. During the threading operation, transfer unit 596 is operated by the other cam 664 and the pointed work blank is received by the transfer fingers of said unit as the gripper mechanism is actuated to release the work blank, after which said fingers and the work blank are moved to a position at the entrance to the lower chute section as seen in Figure 4. It of course will be understood that the set of operating cams are of such form and the gearing is of such ratio that these transfer operations are performed in sequential order in respect to the movement of the ram and movable thread rolling die with relation to the stationary die so that there is a minimum loss of time between successive pointing and thread rolling operations and the discharge of completed work pieces from the machine.

It is to be particularly noted that provision is made for the necessary adjustments to accommodate work blanks of various different lengths and diameters and that the pointing or chamfering of the end of the blank occurs prior to the thread rolling operation and independently thereof. This is an important feature, as it insures a high degree of accuracy in the pointing or chamfering operations and avoids the collection of metal chips upon the threading dies which causes imperfect thread formation on the work piece and has a highly destructive effect on the dies. The novel form and construction of the work transfer units with the mechanism for operating said units in accurately timed relation to each other is also an important practical contribution to the commercial success of machines of this type in which maximum production of the finished product is a prime consideration.

In general, it will be observed from reference to Figures 1 and 2 of the drawings that the several cooperating mechanical units are incorporated in a highly compact machine organization, which, in view of its manifold functions, will occupy a minimum of floor space, and in which, should occasion require, ready access may be had to the various parts of the mechanism for inspection, adjustment or repair.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In work forming mechanism for a threading machine; an upper chute leading from a work holding hopper; a lower chute leading to said thread rolling dies, said chutes being inclined with respect to the horizontal to permit the travel of work blanks therethrough by gravity; a work holding means between adjacent ends of said chutes and spaced from the plane thereof; an axially movable rotary work forming means; means supporting said work forming means for reciprocation to and away from said work holding means in a direction normal to the axes of said chutes; means for transferring work blanks from the lower end of said upper chute to said work holding means through a path having a component normal to the axis of said upper chute; externally accessible means for controlling said component of the path of said transfer means, whereby the ends of said blanks are disposed in said holding means a predetermined distance from the normal position of said work forming means; means to move said work forming means into and out of engagement with said end of said work blank to perform an operation thereon; additional means for transferring said blank from said work holding means and depositing it in the upper end of said lower chute through a path having a component normal to the axis of said upper chute; externally accessible means for controlling said component of the path of said additional transfer means, whereby blanks of varying lengths are deposited in predetermined relation with said lower chute.

2. In work forming mechanism for a threading machine having a pair of thread rolling dies and means for reciprocating one of said dies relative to the other; a gravity feed chute for the work blanks above said dies and obliquely inclined with respect to the path of movement of said reciprocating die, a rotatable work forming head mounted for axial movement in a direction substantially perpendicular to the inclined feed chute, means spaced from the plane of said chute for releasably holding a work blank in coaxial relation with the work forming head, means for axially moving said work forming head toward and away from said work blank, means for successively shifting in a direction parallel to the movement of said forming head and laterally transferring single work blanks from said feed chute to said holding means, means to adjust the shifting movement of the transfer means to dispose the lower end of said blanks in predetermined spaced relation with said work forming head, a second inclined chute spaced from and in substantial parallelism with said feed chute, a second transfer means for shifting in a direction parallel to the movement of said forming head and laterally transferring the formed work blanks from said holder and depositing the same in the upper end of said second chute, means for conveying the work blank from the lower end of the second chute to the thread rolling dies, and cam controlled means individual to the forming head, the two transfer means, the work holder and the conveying means for effectively operating the same in timed relation to each other.

3. In a machine of the character described, an inclined work blank carrying chute terminating in a work feeding station, a plurality of work forming stations spaced from each other and said feeding station, a work holding means at one of said work forming stations, transfer mechanism operable to transfer a work blank from said feeding station to said work holding means at said one of said work forming stations, means operable to transfer a work blank from said working holding means to another of said work forming stations including an independently operable work transfer mechanism of substantially the same construction as said first named transfer mechanism, means for actuating said transfer mechanisms in timed relation to each other in each operating cycle of the machine, means for closing the lower end of said chute, and means responsive to an obstruction in said transfer means for operating said last mentioned means to prevent the transfer of a blank from said work feeding station.

4. The machine defined in claim 3, wherein the transfer means between work forming stations also includes a chute receiving the work blank from said one station, together with conveyor means operable in timed relation with said transfer mechanisms to convey the work blank from said chute to the other work forming station.

5. In a machine of the character described, upper and lower obliquely inclined work chute sections, means mounted between said chute sections and spaced from the plane thereof to releasably grip and hold the shank of an elongated work blank with its axis substantially perpendicular to said inclined chute sections, a work forming head, means to rotate said head, means to simultaneously move said forming head axially of the work blank, independently operable first and second transfer mechanisms including work gripping means, said transfer mechanisms being positioned at opposite sides of said work holding means to respectively transfer a work blank from the upper chute section to said holding means and from said holding means to the lower chute section, means for actuating said transfer mechanisms in timed relation to each other, externally accessible means for adjusting said first transfer mechanism to dispose the lower ends of said work blanks in predetermined spaced relation with respect to said work forming head, and means for actuating said work holding means to receive and release the work blanks in timed relation with the operation of said work forming head and transfer mechanisms.

6. The machine defined in claim 5, in which the means for actuating said work holding means and for axially moving the work forming head comprises individual cam controlled mechanisms operatively connected with said work holding means and forming head respectively.

7. In a machine of the character described, upper and lower laterally spaced apart, inclined work chute sections, work holding means between said chute sections, a work pointing unit associated therewith, separate work transfer units at each side of said work pointing unit respectively operable to transfer a work blank from the upper chute section to said holding means and from said holding means to the lower chute section, means for independently bodily adjusting said work pointing unit and work transfer units along parallel paths substantially perpendicular to said inclined chute sections to dispose the lower ends of work blanks of different lengths in predetermined position with respect to the pointing unit, and means for mounting said lower chute section for bodily adjustment relative to the upper chute section in a direction normal to the axes of said chute sections.

8. The machine defined in claim 7, together with means associated with the lower chute section for conveying the work blanks therefrom to a second work forming unit, and means for vertically adjusting said lower chute section and conveyor means as a unit with respect to said upper chute section.

9. In a machine of the character described, upper and lower laterally spaced apart inclined work chute sections, work holding means between said chute sections, a work pointing unit associated therewith, a work transfer unit at each side of said work pointing unit respectively operable to transfer a work blank from the upper chute section to said holding means and from said holding means to the lower chute section, means for independently bodily adjusting said work pointing unit and work transfer units along parallel paths substantially perpendicular to said inclined chute sections in accordance with work blanks of different lengths, means for conveying a work blank from the lower chute section to a work forming unit, a reciprocatory pusher plate to engage and position the work blanks relative to said work forming unit, and separate means for adjusting said lower chute section, the conveyor means and said pusher plate relative to said work forming unit and the upper chute section in a direction normal to the axes of said chute sections to dispose the work blanks in predetermined position with respect to said work forming unit.

ARTHUR H. BILLOW.

References Cited in the file of this patent

UNITED STATES PATENTS

| Number | Name | Date |
| --- | --- | --- |
| 495,201 | Jones | Apr. 11, 1893 |
| 722,300 | Haskins | Mar. 10, 1903 |
| 1,026,083 | Duston | May 14, 1912 |
| 1,253,323 | Wilcox | Jan. 15, 1918 |
| 1,624,872 | Kingsbury | Apr. 12, 1927 |
| 1,762,649 | Andrews et al. | June 10, 1930 |
| 1,841,800 | Gale | Jan. 19, 1932 |
| 1,865,293 | Andrews | June 28, 1932 |
| 1,912,211 | Mathias | May 30, 1933 |
| 2,020,658 | Frost | Nov. 12, 1935 |
| 2,020,659 | Frost | Nov. 12, 1935 |
| 2,025,855 | Friedman | Dec. 31, 1935 |
| 2,174,968 | Cherry et al. | Oct 3, 1939 |
| 2,272,758 | Wilcox | Feb. 10, 1942 |
| 2,343,798 | Poupitch | Mar. 7, 1944 |